(12) United States Patent  
Nakata

(10) Patent No.: US 9,485,479 B2
(45) Date of Patent: Nov. 1, 2016

(54) INFORMATION PROCESSING APPARATUS AND METHOD, AND PHOTOELECTRIC CONVERSION APPARATUS

(71) Applicant: Sony Corporation, Tokyo (JP)

(72) Inventor: Masashi Nakata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/801,644

(22) Filed: Jul. 16, 2015

(65) Prior Publication Data

US 2015/0326770 A1 Nov. 12, 2015

Related U.S. Application Data

(63) Continuation of application No. 13/922,014, filed on Jun. 19, 2013, now Pat. No. 9,124,753.

(30) Foreign Application Priority Data

Jun. 26, 2012 (JP) ................................. 2012-142695

(51) Int. Cl.
*G06F 3/038* (2013.01)
*G09G 5/00* (2006.01)
*H04N 9/04* (2006.01)
*H04N 5/235* (2006.01)
*H04N 9/73* (2006.01)

(52) U.S. Cl.
CPC ............ *H04N 9/045* (2013.01); *H04N 5/2351* (2013.01); *H04N 9/735* (2013.01); *H04N 2209/042* (2013.01)

(58) Field of Classification Search
None
See application file for complete search history.

(56) References Cited

U.S. PATENT DOCUMENTS

2008/0303918 A1 * 12/2008 Keithley ................. G09G 3/20
348/223.1

* cited by examiner

*Primary Examiner* — Nicholas Lee
(74) *Attorney, Agent, or Firm* — Chip Law Group

(57) ABSTRACT

An information processing apparatus includes: multiple optical propagation paths configured to propagate light; a photoelectric conversion element configured to perform photoelectric conversion on light propagated through each of the multiple optical propagation paths at mutually different partial areas in a photoelectric conversion area; and an estimating unit configured to estimate illuminance or color temperature to be obtained at the photoelectric conversion element, using an electric signal corresponding to light propagated through each of the optical propagation paths.

6 Claims, 21 Drawing Sheets

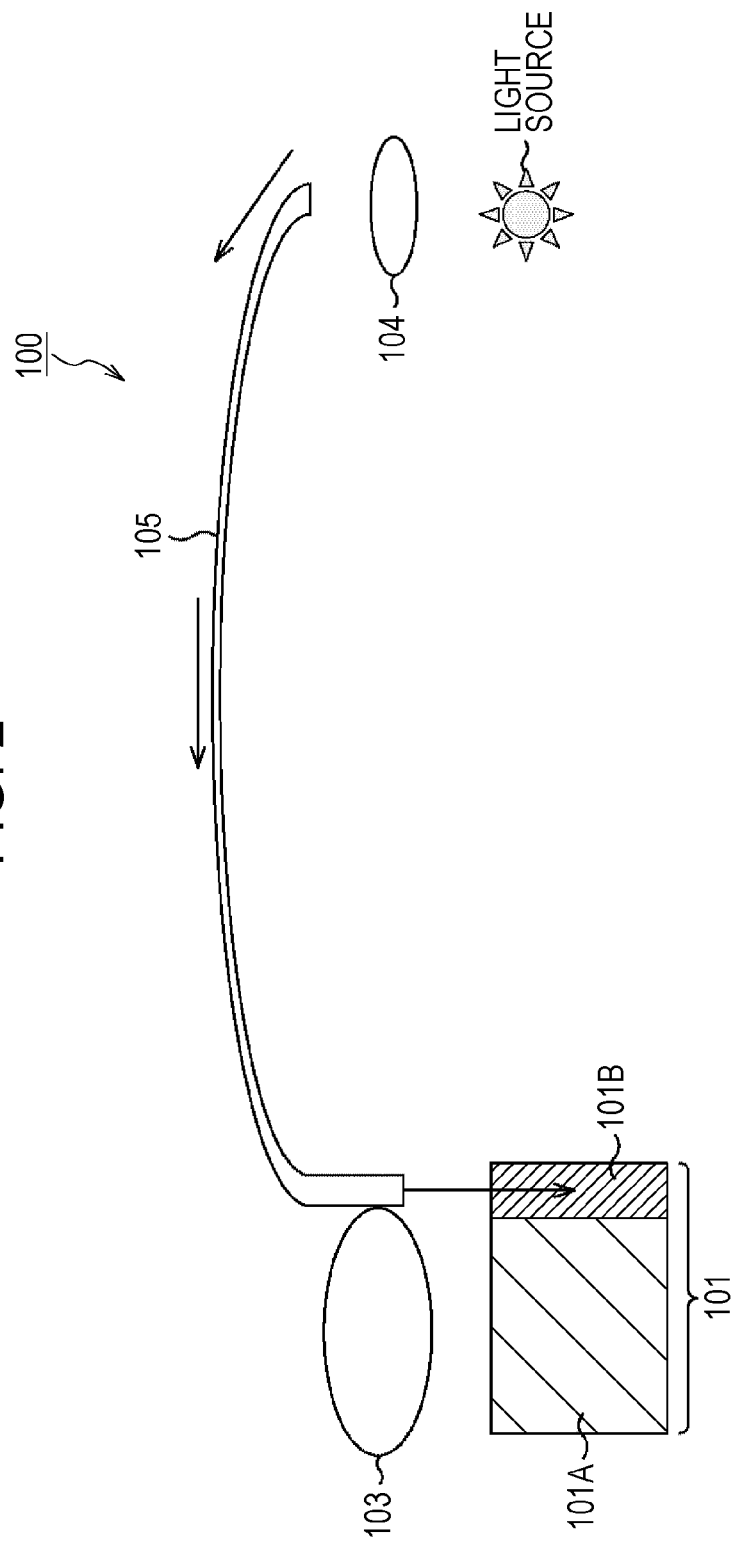

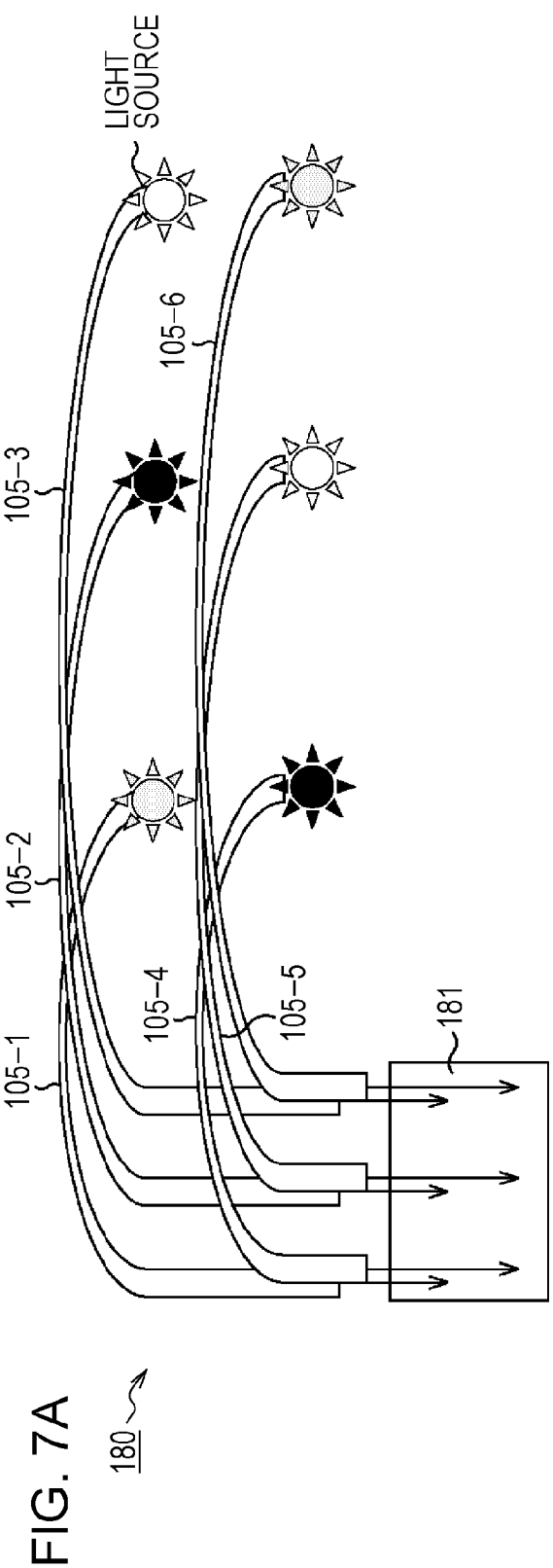
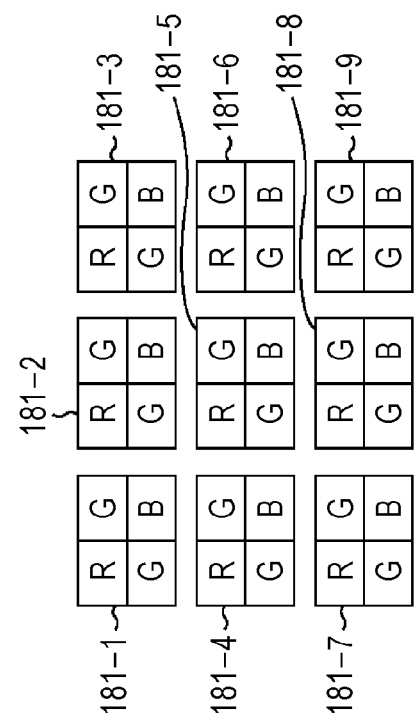
FIG. 7A
FIG. 7B

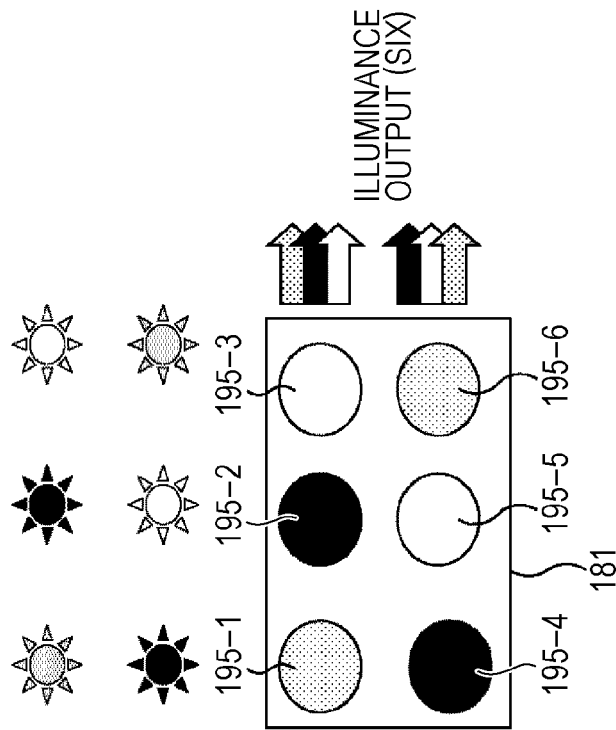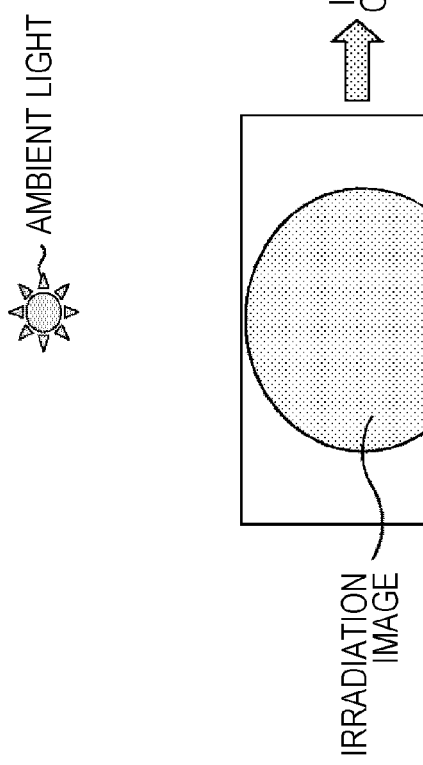

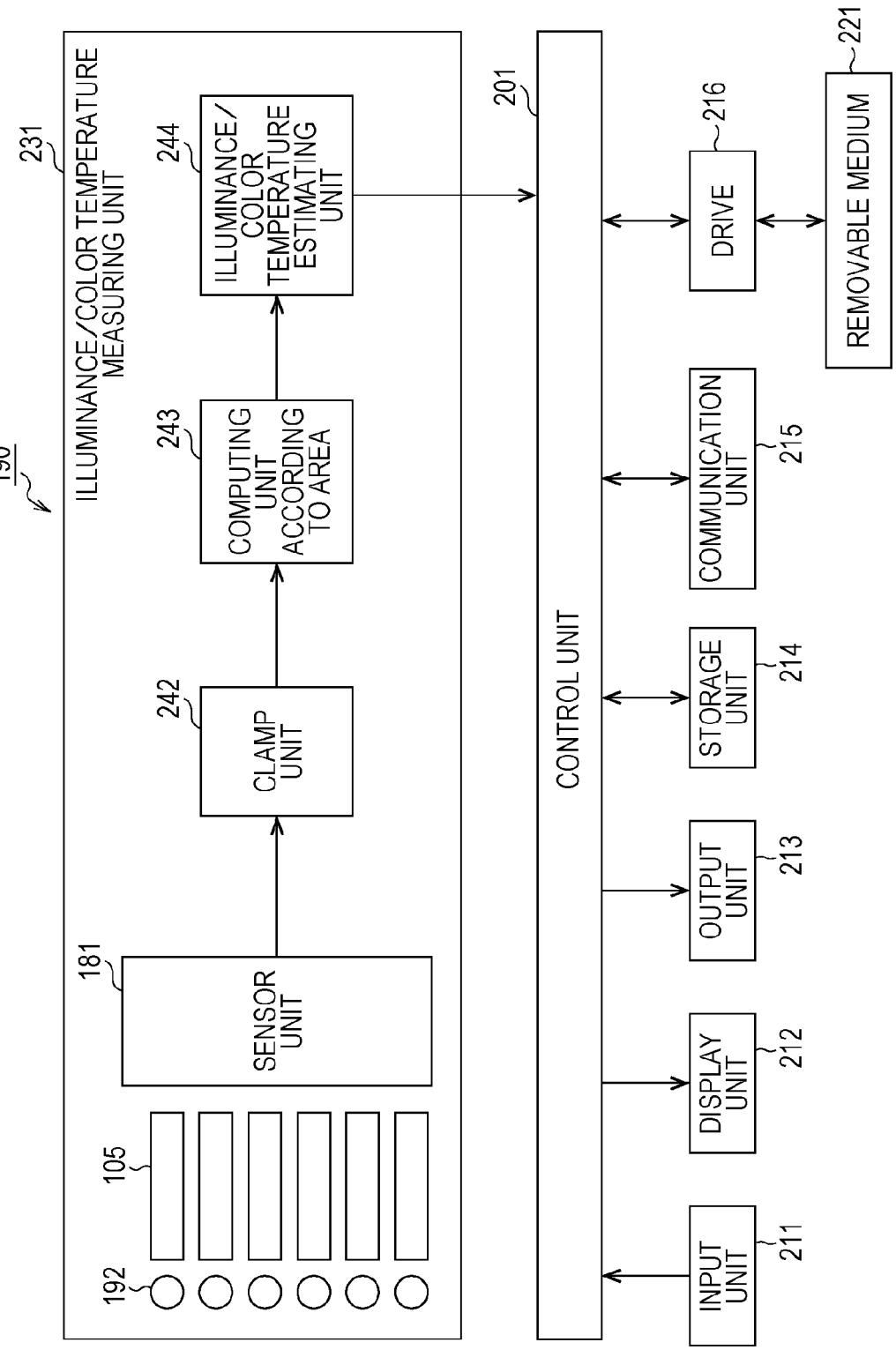

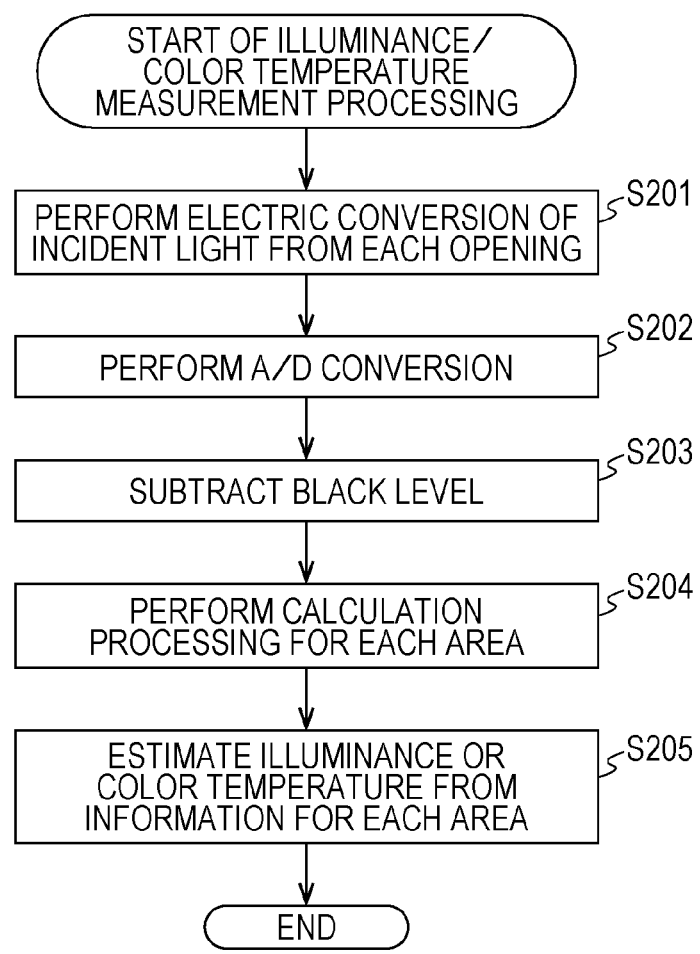

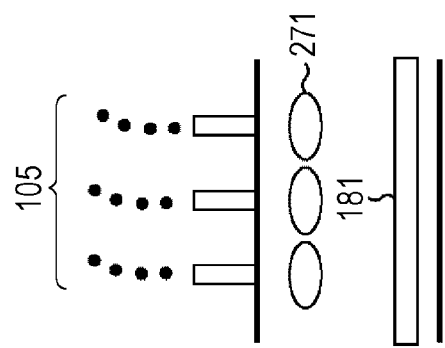
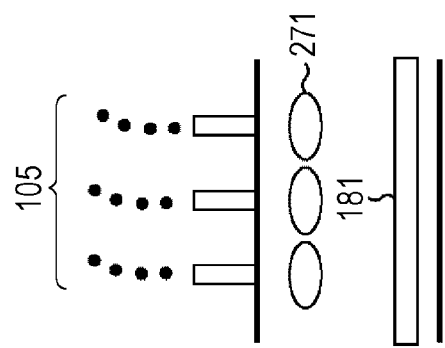
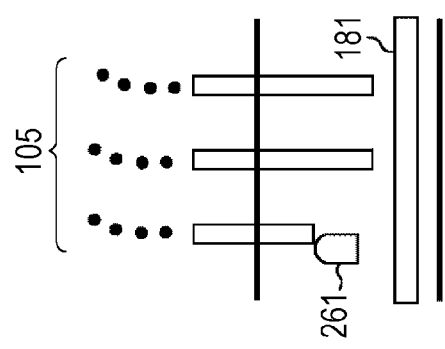
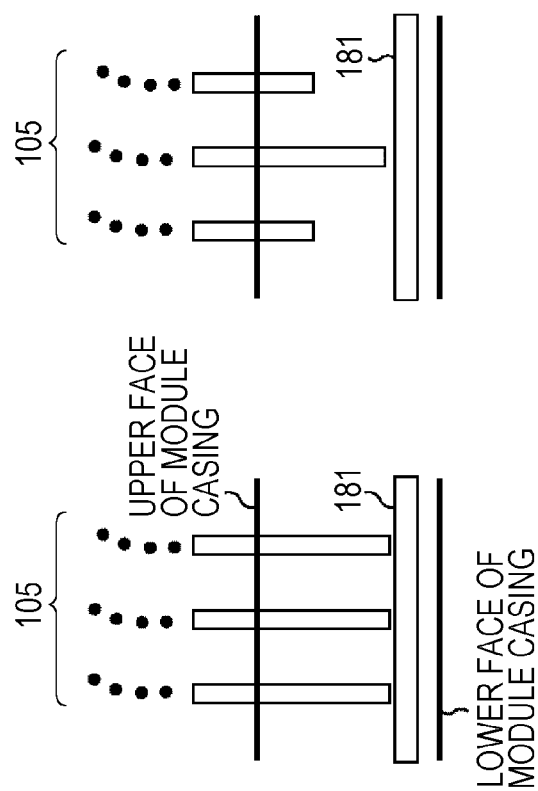

INFORMATION PROCESSING APPARATUS AND METHOD, AND PHOTOELECTRIC CONVERSION APPARATUS

CROSS-REFERENCE TO RELATED APPLICATIONS

This application is a continuation of U.S. patent application Ser. No. 13/922,014, filed Jun. 19, 2013, which claims priority to Japanese Patent Application JP 2012-142695, filed in the Japan Patent Office on Jun. 26, 2012, the entire contents of which are hereby incorporated herein by reference.

BACKGROUND

The present disclosure relates to an information processing apparatus and method, and a photoelectric conversion apparatus, and specifically relates to an information processing apparatus and method, and a photoelectric conversion apparatus, which enables photoelectric conversion to be performed on light received at multiple light-receiving units, independent from each other, while suppressing increase in the number of elements.

Illuminance sensors and color temperature sensors have been mounted on various electronic devices including cellular phones and televisions (e.g., see Japanese Unexamined Patent Application Publication Nos. 2011-166491 and 2011-59543). With such an electronic device, a surrounding environment (brightness and color temperature of illumination) where the device is used is estimated, and accordingly, the brightness or color of a display screen (liquid crystal or organic EL) may be adjusted, for example. This is operation such that when the circumference is bright, the display is also brightened, and when the circumference is dark, the display is also darkened. Thus, display luminance and so forth may be adjusted to brightness that feels comfortable to humans.

With such an illuminance sensor, an organic photoelectric conversion film, and so forth may be employed as an element capable of photoelectric conversion, an element including a photodiode (e.g., see Japanese Unexamined Patent Application Publication Nos. 2008-103368 and 2011-29453). Illuminance or color temperature is estimated from an output value after photoelectric conversion using such an element, and accordingly, operation as described above may be performed.

SUMMARY

However, in order to provide such sensors, elements configured to perform photoelectric conversion have to be provided only the number of the sensors thereof. Therefore, not only is there concern that will be difficult to reduce the size of the apparatus, but also there is concern that costs and consumption power might increase.

It has been found to be desirable to enable photoelectric conversion to be mutually independently performed on light received at multiple light-receiving units while suppressing increase in the number of elements.

An embodiment of the present disclosure is An information processing apparatus including: multiple optical propagation paths configured to propagate light; a photoelectric conversion element configured to perform photoelectric conversion on light propagated through each of the multiple optical propagation paths at mutually different partial areas in a photoelectric conversion area; and an estimating unit configured to estimate illuminance or color temperature to be obtained at the photoelectric conversion element, using an electric signal corresponding to light propagated through each of the optical propagation paths.

The information processing apparatus may further include a control unit configured to control execution of processing based on the illuminance or the color temperature estimated by the estimating unit.

The information processing apparatus may further include an operation accepting unit configured to accept a user operation based on the illuminance or the color temperature estimated by the estimating unit, with the control unit controlling execution of the processing in accordance with the user operation accepted by the operation accepting unit.

The information processing apparatus may further include a detecting unit configured to detect a position based on the illuminance or the color temperature estimated by the estimating unit, with the control unit controlling execution of the processing in accordance with the position detected by the detecting unit.

The information processing apparatus may further include a display unit configured to display information, with the control unit controlling luminance of the display unit based on the illuminance or the color temperature estimated by the estimating unit.

The control unit may control execution of the processing based on temporal change in the illuminance or the color temperature estimated by the estimating unit.

The information processing apparatus may further include an emission unit configured to emit light, with the optical propagation paths propagating light output from the emission unit in a direction opposite to light to be subjected to photoelectric conversion.

An embodiment of the present disclosure is an information processing method for an information processing apparatus, with the information processing apparatus performing photoelectric conversion on light propagated through multiple optical propagation paths configured to propagate light, at mutually different partial areas in a photoelectric conversion area, and estimating illuminance or color temperature using an obtained electric signal corresponding to light propagated through each of the optical propagation paths.

Another embodiment of the present disclosure is an information processing apparatus including: an optical propagation path configured to propagate light; a photoelectric conversion element configured to perform photoelectric conversion on light propagated through the optical propagation path at a partial area in a photoelectric conversion area, and to perform photoelectric conversion on light not propagated through the optical propagation path at another area in the photoelectric conversion area; and an estimating unit configured to estimate illuminance or color temperature to be obtained at the partial area in the photoelectric conversion area, using an electric signal corresponding to light propagated through the optical propagation path.

The information processing apparatus may further include a module configured to shield the whole of the photoelectric conversion area against peripheries excluding an optical path of light where photoelectric conversion is performed.

The information processing apparatus may further include a shielding plate configured to mutually shield the partial area and the other area.

The photoelectric conversion element may include a first readout unit configured to read out an electric signal to be obtained in the partial area, and a second readout unit configured to read out an electric signal to be obtained in the other area, which operates independently from the first readout unit.

The information processing apparatus may further include an image data generator configured to generate image data using an electric signal corresponding to light not propagated through the optical propagation path, to be obtained in the other area.

Another embodiment of the present disclosure is an information processing method for an information processing apparatus, with the information processing apparatus performing, in a partial area of a photoelectric conversion area of a photoelectric conversion element, photoelectric conversion on light propagated through an optical propagation path, estimating illuminance or color temperature using an obtained electric signal, and performing, in another area in the photoelectric conversion area, photoelectric conversion on light not propagated through the optical propagation path.

Yet another embodiment of the present disclosure is a photoelectric conversion apparatus including: multiple optical propagation paths configured to propagate light; and a photoelectric conversion element configured to perform photoelectric conversion on lights propagated through the multiple optical propagation paths at mutually different partial areas in a photoelectric conversion area.

The optical propagation path may be made up of a predetermined substance, with the light propagating through the substance.

The optical propagation path may be an optical fiber made of quartz glass.

Yet another embodiment of the present disclosure is a photoelectric conversion apparatus including: an optical propagation path configured to propagate light; and a photoelectric conversion element configured to perform photoelectric conversion on light propagated through the optical propagation path at a partial area in a photoelectric conversion area, and to perform photoelectric conversion on light not propagated through the optical propagation path at another area in the photoelectric conversion area.

The optical propagation path may be made up of a predetermined substance, with the light propagating through the substance.

The optical propagation path may be an optical fiber made of quartz glass.

With an embodiment of the present disclosure, photoelectric conversion is performed on lights propagated through multiple optical propagation paths at mutually different partial areas in a photoelectric conversion area, and illuminance or color temperature is estimated using an obtained electric signal corresponding to light propagated through each of the optical propagation paths.

With another embodiment of the present disclosure, in a partial area of a photoelectric conversion area of a photoelectric conversion element, photoelectric conversion is performed on light propagated through an optical propagation path, illuminance or color temperature is estimated using an obtained electric signal, and in another area in the photoelectric conversion area, photoelectric conversion is performed on light not propagated through an optical propagation path.

With yet another embodiment of the present disclosure, light is propagated through multiple optical propagation paths, and photoelectric conversion is performed on the lights thereof propagated through the multiple optical propagation paths at mutually different partial areas in a photoelectric conversion area.

With yet another embodiment of the present disclosure, light is propagated through an optical propagation path, photoelectric conversion is performed on light propagated through the optical propagation path at a partial area of a photoelectric conversion area, and photoelectric conversion is performed on light not propagated through the optical propagation path thereof at another area of the photoelectric conversion area.

According to the present disclosure, photoelectric conversion may be performed on incident light. In particular, photoelectric conversion may mutually independently be performed on lights received at multiple light-receiving units while suppressing increase in the number of elements.

BRIEF DESCRIPTION OF THE DRAWINGS

FIG. 2 is a diagram illustrating a principal configuration example of a photoelectric conversion apparatus to which the present technology has been applied;

FIGS. 7A and 7B are diagram illustrating another configuration example of a photoelectric conversion apparatus to which the present technology has been applied;

FIGS. 9A and 9B are diagrams for describing a scene of irradiation of light for a sensor;

FIG. 10 is a block diagram illustrating a principal configuration example of the electronic device;

FIG. 11 is a flowchart for describing an example of flow of illuminance measurement processing;

FIGS. 18A to 18D are diagrams for describing an installation example of an optical propagation path;

DETAILED DESCRIPTION OF EMBODIMENTS

Hereinafter, embodiments for carrying out the present technology (hereinafter, referred to simply as embodiments) will be described. Note that description will be made in the following sequence.
1. First Embodiment (photoelectric conversion apparatus, electronic device)
2. Second Embodiment (photoelectric conversion apparatus, electronic device)
3. Third Embodiment (Application)

1. First Embodiment

Electronic Device with Sensor

With various electronic devices including cellular phones and televisions, a surrounding environment (brightness and color temperature of illumination) where the device is used is estimated, and accordingly, the brightness or color of a display screen (liquid crystal or organic EL) may be adjusted, for example. For example, operation control may be performed wherein when the circumference is bright, the display is also brightened, and when the circumference is dark, the display is also darkened. Thus, display luminance and so forth may be adjusted to brightness that feels comfortable to humans.
Photoelectric Conversion Apparatus and Information Processing Apparatus Therefore, with such an electronic device, for example, as illustrated in FIGS. 1A and 1B, various sensors such as an illuminance sensor configured of an element including a photodiode, an organic photoelectric conversion film, and so forth, are provided.

Figure 1A:
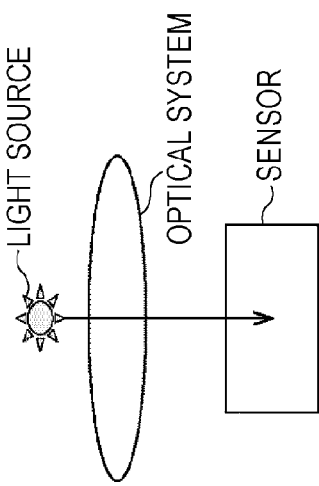
FIGS. 1A and 1B are diagrams illustrating a principal configuration example of a common electronic device.

At this time, in general, as illustrated in FIG. 1A, one sensor performs photoelectric conversion on light to be supplied via one optical system. That is to say, the sensor outputs detected illuminance, color temperature, or the like as one detection result.

Figure 1B:
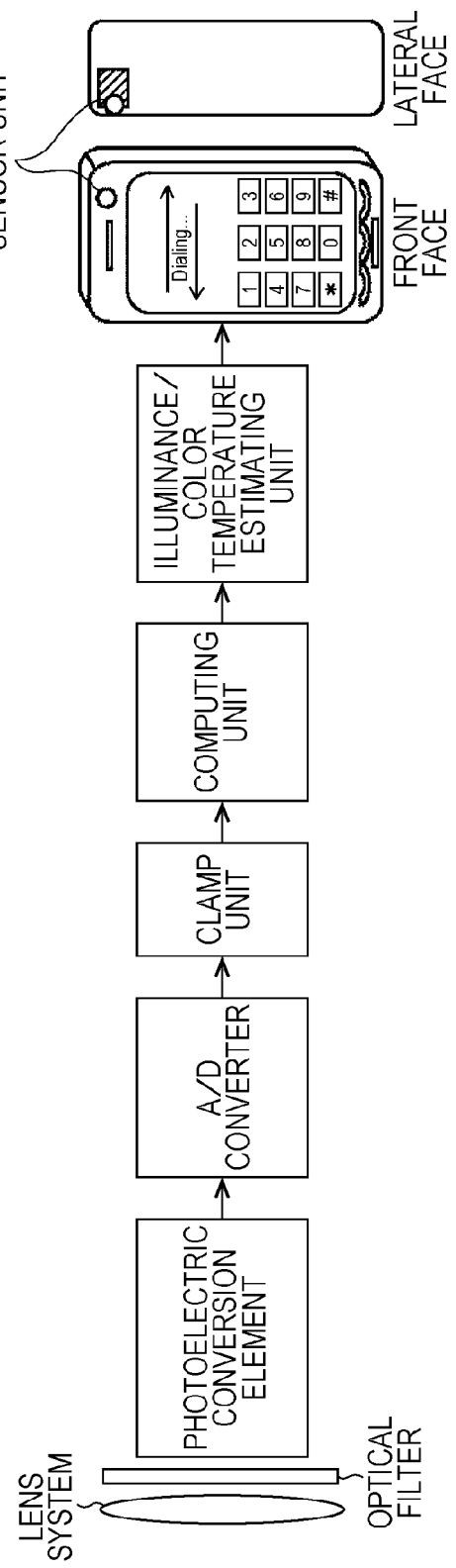

The interior of the electronic device is configured as illustrated in FIG. 1B, for example. A photoelectric conversion element performs photoelectric conversion on incident light input via a lens system and an optical filter, an A/D converter digitizes the electric signal thereof, and a clamp unit subtracts a black level therefrom. A computing unit converts, in the event that the sensor has multiple colors such as RGB or the like, each color into a numeric value for obtaining illuminance or color temperature by applying gain to each or performing addition/subtraction of each value so as to approximate to human visual perception properties. An illuminance/color temperature estimating unit estimates illuminance and color temperature from numerical information obtained from the computing unit. The electronic device controls execution of processing such as adjustment of display luminance based on this estimation result, for example.

In the event of newly providing such sensors, elements configured to perform photoelectric conversion have to be provided of a number corresponding to the number of sensors thereof. Therefore, there is concern that reducing the size of the apparatus may be difficult, or cost and consumption power increases. Also, there is also concern that reliability may decrease.

For example, in order to further improve a device control function using such sensing, it may be conceived to perform a greater variety of sensing. Further, a case may also be conceived where apart from these sensors, a camera for photo shooting, a light emitting diode (LED) for state notice (a lighting unit for informing of an incoming call in the case of a phone), or the like is provided.

Also, in order to perform more accurate sensing, or the like, a case may also be conceived where multiple sensors are provided. For example, a method may be conceived wherein an illuminance sensor is provided to multiple positions of a casing, and illuminance of each position is measured. For example, brightness control of a display is performed based on the illuminance of each position, and accordingly, control based on significant points may be suppressed, and more suitable control may be performed.

However, the greater the number of elements, as described above, the higher the difficulty level of design becomes, and the greater the number of parts becomes, so accordingly, there is concern that reducing the size of the apparatus may be difficult, cost and consumption power will be further increased, and reliability will be further decreased.

Therefore, a photoelectric conversion apparatus is configured to include an optical propagation path configured to propagate light, and a photoelectric conversion element configured to perform photoelectric conversion on light propagated through the optical propagation path in a partial area of a photoelectric conversion area, and to perform photoelectric conversion on light not propagated through the optical propagation path in another area of the photoelectric conversion area.

The photoelectric conversion apparatus mentioned here is an apparatus having a function for converting light into an electric signal. For example, the photoelectric conversion apparatus includes an imaging apparatus configured to convert a subject image into an electric signal (convert into digital data). Also, the photoelectric conversion apparatus includes an optical sensor such as an illuminance sensor configured to measure light amount, a color temperature sensor configured to measure the color temperature of light, or the like. Further, the photoelectric conversion apparatus includes an optional electronic device (also referred to as information processing apparatus) using such an imaging function or optical sensor.

The optical propagation path is an element configured to propagate light received at a light-receiving unit of the photoelectric conversion apparatus to the photoelectric conversion element.

The photoelectric conversion element is an element configured to convert light into an electric signal using a photodiode, an organic photoelectric conversion film, and so forth. The photoelectric conversion area is an area where light is converted into an electric signal of a light-receiving surface where the light of the photoelectric conversion element is irradiated, that is, an area where a photodiode, an organic photoelectric conversion film, and so forth are formed.

This photoelectric conversion area includes multiple pixels which are mutually independent configurations (increments) configured to convert light into an electric signal. That is to say, the number of pixels of this photoelectric conversion area may be optional as long as the number is two pixels or more. As described above, the photoelectric conversion element performs photoelectric conversion on light propagated through the optical propagation path in a partial area of the photoelectric conversion area, and performs photoelectric conversion on light not propagated through the optical propagation path in another area of the photoelectric conversion area. In other words, the photoelectric conversion element performs photoelectric conversion on light propagated through the optical propagation path, and light not propagated through the optical propagation path at one pixel or multiple pixels which mutually differ.

Thus, according to the one photoelectric conversion element, lights received at the multiple light-receiving units may be converted into electric signals in a mutually independent manner. Accordingly, the photoelectric conversion element does not have to be provided only by the number of the light-receiving units. That is to say, as compared to the case thereof, the number of elements may be decreased. Accordingly, increase in difficulty of reduction in size of the photoelectric conversion apparatus may be suppressed, and increase in cost and consumption power may be suppressed. Also, reduction in reliability may be suppressed.

Note that such multiple configurations may be provided to the photoelectric conversion apparatus. That is to say, multiple photoelectric conversion elements may be provided. Even in such a case, with the photoelectric conversion apparatus, photoelectric conversion may be performed on light received at light-receiving units of which the number is greater than the number of photoelectric conversion elements, and accordingly, increase in the number of elements is suppressed, and the above-mentioned advantage is yielded.

Note that, an arrangement may be made wherein the above-mentioned optical propagation path is made of a predetermined substance, and light propagates through the substance thereof. That is to say, light received at the light-receiving units may propagate through a substance making up the optical propagation path. For example, the optical propagation path may be realized as an optical fiber made of quartz glass.

The optical propagation path is an optical path where light received at a light-receiving unit is guided to the photoelectric conversion area, a configuration thereof is optional, but it goes without saying that it is desirable that the configuration thereof is simple. Accordingly, the optical propagation path may be configured in a more simple manner by being realized with an optical fiber instead of being realized with a mirror or prism. That is to say, increase in the number of elements may be suppressed, and the above-mentioned advantage may be obtained. Also, design of the optical propagation path is also facilitated.

In addition to the configurations of the photoelectric conversion apparatus as described above, there may be employed an information processing apparatus including an estimating unit configured to estimate illuminance or color temperature using an electric signal corresponding to light propagated through the optical propagation path, to be obtained in a partial area of the photoelectric conversion area.

The electric signal subjected to photoelectric conversion at the photoelectric conversion apparatus may be used in any way. For example, the electric signal obtained by performing photoelectric conversion on light propagated through the optical propagation path may be taken as optical sensor output. The optical sensor mentioned here is a sensor configured to detect optical features such as illuminance, color temperature, and so forth, for example. That is to say, the optical sensor includes an illuminance sensor configured to detect the illuminance of light received at the light-receiving unit, and a color temperature sensor configured to detect the color temperature of light received at the light-receiving unit. It goes without saying that a sensor configured to detect optical features other than those may be employed.

For example, in the event that one optical propagation path is formed of one optical fiber, light internally reflects repeatedly, and accordingly, propagation of images is generally difficult. That is to say, even when performing photoelectric conversion on light propagated through such an optical propagation path using multiple pixels, it is difficult to reproduce images from the light received at the light-receiving unit.

However, for example, optical features, such as illuminance, color temperature, and so forth, may be readily detected. Therefore, as described above, an arrangement may be made wherein an estimating unit configured to estimate optical features from an electric signal subjected to photoelectric conversion is provided, and the estimation result thereof is output as optical sensor output. Thus, the number of elements may be suppressed with the information processing apparatus (electronic device). That is to say, reduction in the size of the apparatus is facilitated with the information processing apparatus, and also optical sensor output (estimation result) may be obtained along with an electric signal corresponding to light not propagated through the optical propagation path while suppressing increase in cost and consumption power and reduction in reliability.

Note that, the above-mentioned information processing apparatus may further include a module configured to shield the entire photoelectric conversion area against the circumference excluding the optical path of light to be subjected to photoelectric conversion. That is to say, an optical path from the light-receiving unit to the photoelectric conversion element may be shielded against the exterior thereof. Thus, loss in propagation of light may be suppressed, and efficiency of photoelectric conversion may be improved.

Further, the information processing apparatus may further include a shielding plate configured to mutually shield a partial area and another area in the photoelectric conversion area. As described above, in a partial area of the photoelectric conversion area, light propagated through the optical propagation path is subjected to photoelectric conversion, and in another area, light not propagated through the optical propagation path is subjected to photoelectric conversion. That is to say, in this partial area and other area, lights received at the light-receiving units which mutually differ are subjected to photoelectric conversion. Accordingly, in between theses areas is shielded with a shielding plate, and these lights are suppressed so as not to invade (so as not to become mixed in) the other area, so the photoelectric conversion result of each light may be obtained in a more accurate manner.

The photoelectric conversion element may further include a first readout unit configured to read out an electric signal to be obtained in a partial area, and a second readout unit configured to read out an electric signal to be obtained in another area, which operates independently from the first readout unit. That is to say, readout of a photoelectric conversion result (electric signal) may be performed mutually independently between a partial area and another area. Thus, readout of an electric signal in each area may be performed independently from another area, and flexibility of readout timing, readout method, and so forth may be improved.

Also, the information processing apparatus may further include a first A/D converter configured to perform A/D conversion on an electric signal read out from a partial area by the first readout unit, and a second A/D converter configured to perform A/D conversion on an electric signal read out from another area by the second readout unit. Thus, an electric signal to be read out from each area may be output as digital data.

The information processing apparatus may further include an image data generator configured to generate image data using an electric signal corresponding to light not propagated through the optical propagation path, obtained at the other area. The light not propagated through the optical propagation path is guided from the light-receiving unit to the photoelectric conversion element via a lens or mirror or the like as an image, for example. That is to say, the electric signal obtained in another area is equivalent to an image in light received at the light-receiving unit. Accordingly, there is provided the image data generator configured to obtain image data in a predetermined format from an electric signal obtained in another area, and accordingly, the electric signal to be read out from the other area may be output as image data.

Note that the above-mentioned configuration of the information processing apparatus may be realized as a method (information processing method).

Photoelectric Conversion Apparatus

A more specific example will be described. FIG. 2 illustrates a partial configuration example of a photoelectric conversion apparatus to which the present technology has been applied. In FIG. 2, a photoelectric conversion apparatus 100 is one mode of a photoelectric conversion apparatus configured to mutually independently subject lights received at multiple light-receiving units to photoelectric conversion.

As illustrated in FIG. 2, the photoelectric conversion apparatus 100 includes a photoelectric conversion unit 101, an optical system 103, an optical system 104, and an optical propagation path 105.

The photoelectric conversion unit 101 is one mode of a photoelectric conversion element configured to convert light into an electric signal, and has a photoelectric conversion area where light is converted into an electric signal, at a light-receiving surface where light is irradiated. This photoelectric conversion area is an area where a photodiode, an organic photoelectric conversion film, and so forth are formed. This photoelectric conversion area is divided into two areas of an imaging unit 101A and a sensor unit 101B.

The imaging unit 101A is made up of a pixel configuration group (multiple pixels) each including a photodiode, an organic photoelectric conversion film, and so forth, and subjects light received at a light-receiving unit of the optical system 100 to photoelectric conversion.

The sensor unit 101B is made up of a pixel configuration group (multiple pixels) each including a photodiode, an organic photoelectric conversion film, and so forth, and subjects incident light to be input via the optical system 104 and to propagate through the optical propagation path 105, to photoelectric conversion.

The optical system 103 is configured of, for example, optical components such as a lens, a diaphragm, and so forth, and subjects light received at a light-receiving unit corresponding to the optical system 103 to optical effects. The optical system 104 is, as with the optical system 103, configured of, for example, optical components such as a lens, a diaphragm, and so forth, and subjects light received at a light-receiving unit corresponding to the optical system 104 to optical effects. Note that the light-receiving unit corresponding to the optical system 103 and the light-receiving unit corresponding to the optical system 104 mutually differ. The optical propagation path 105 propagates light received at the light-receiving unit corresponding to the optical system 104 and guided via the optical system 104 to the sensor unit 101B of the photoelectric conversion unit 101. The optical propagation path 105 is configured of a substance configured to internally propagate light, for example. For example, such as an optical fiber made of quartz glass or the like, a material having a low loss rate is desirable.

The light received at the light-receiving unit corresponding to the optical system 104 is propagated to the sensor unit 101B of the photoelectric conversion unit 101 via the optical system 104 and optical propagation path 105. The optical propagation path 105 is thus provided, and accordingly, the light-receiving unit corresponding to the optical system 104 may be readily provided in a more optional position against the position of the photoelectric conversion unit 101. For example, the light-receiving unit corresponding to the optical system 104 may also be provided in a position far away from the photoelectric conversion unit 101, and also be provided in a direction different from the direction of the photoelectric conversion unit 101. Also, design of the optical path in this case is easy.

Also, the light-receiving unit corresponding to the optical system 103 is input to the imaging unit 101A of the photoelectric conversion unit 101 via the optical system 103 without propagating the optical propagation path 105. That is to say, the light-receiving unit corresponding to the optical system 104 may be readily provided in an optional position not only from the position of the photoelectric conversion unit 101 but also from the position of the light-receiving unit corresponding to the optical system 103. For example, the light-receiving unit corresponding to the optical system 104 may also be provided in a position away from the light-receiving unit corresponding to the optical system 103, and may also be provided in a direction different from the direction of the light-receiving unit corresponding to the optical system 103. Also, design of the optical path in this case is easy.

In other words, the photoelectric conversion unit 101 may subject lights received at multiple light-receiving units having an optional position and direction to photoelectric conversion. That is to say, flexibility (design flexibility) of the position of the photoelectric conversion unit 101 may be improved. That is to say, design of the photoelectric conversion apparatus 100 is further facilitated, and accordingly, reduction in the size of the apparatus is further facilitated.

Also, the photoelectric conversion unit 101 is one element to be formed on one silicon substrate. That is to say, lights received at multiple light-receiving units are subjected to photoelectric conversion by one element. Accordingly, an element configured to perform photoelectric conversion does not have to be provided for each light-receiving unit, and increase in the number of elements may be suppressed. Thus, reduction in the size of the apparatus is facilitated, and also, increase in cost and consumption power may be suppressed. Also, reduction in reliability may also be suppressed.

Also, as described above, the light received at the light-receiving unit corresponding to the optical system 103 is subjected to photoelectric conversion at the imaging unit 101A, and the light received at the light-receiving unit corresponding to the optical system 104 is subjected to photoelectric conversion at the sensor unit 101B. That is to say, the photoelectric conversion unit 101 subjects lights received at the mutually different light-receiving units to photoelectric conversion in the mutually different areas in the photoelectric conversion area. Accordingly, the photoelectric conversion unit 101 may subject both lights to photoelectric conversion in a mutually independent manner.

Note that an optical path from the light-receiving unit corresponding to the optical system 103 to the imaging unit 101A is formed with priority on non-distortion of an image due to the light received at the light-receiving unit corresponding to the optical system 103. That is to say, image data corresponding to a subject image at the head of the light-receiving unit corresponding to the optical system 103 may be obtained using an electric signal obtained by photoelectric conversion at the imaging unit 101A. Accordingly, the imaging unit 101A may be employed for subject images.

On the other hand, light which propagates the optical propagation path 105 repeats reflection within the optical propagation path 105. Accordingly, with this propagation, holding of an image due to light received at the light-receiving unit corresponding to the optical system 104 is difficult. That is to say, it is difficult to obtain image data corresponding to a subject image at the head of the light-receiving unit corresponding to the optical system 104, using an electric signal obtained by photoelectric conversion at the sensor unit 101B. However, optical features such as illuminance, color temperature, and so forth in the vicinity of the light-receiving unit corresponding to the optical system 104 may be detected using an electric signal obtained by photoelectric conversion at the sensor unit 101B. That is to say, the sensor unit 101B may be employed for detection (sensor) of optical features.

In this manner, the photoelectric conversion unit 101 may subject lights obtained at the light-receiving units to photoelectric conversion in a mutually independent manner, and accordingly, the lights may also be used for mutually different applications. In such a case as well, increase in the number of elements may be suppressed. Note that, hereinafter, description will be made using the above-mentioned application example, but the above-mentioned application example is an example, and the present embodiment is not restricted to this. It goes without saying that an electric signal to be obtained at the imaging unit 101A may be employed for another application (e.g., for detection (sensor) of optical features). Also, an electric signal to be obtained at the sensor unit 101B may be employed for another application (e.g., for imaging).

Figure 3:
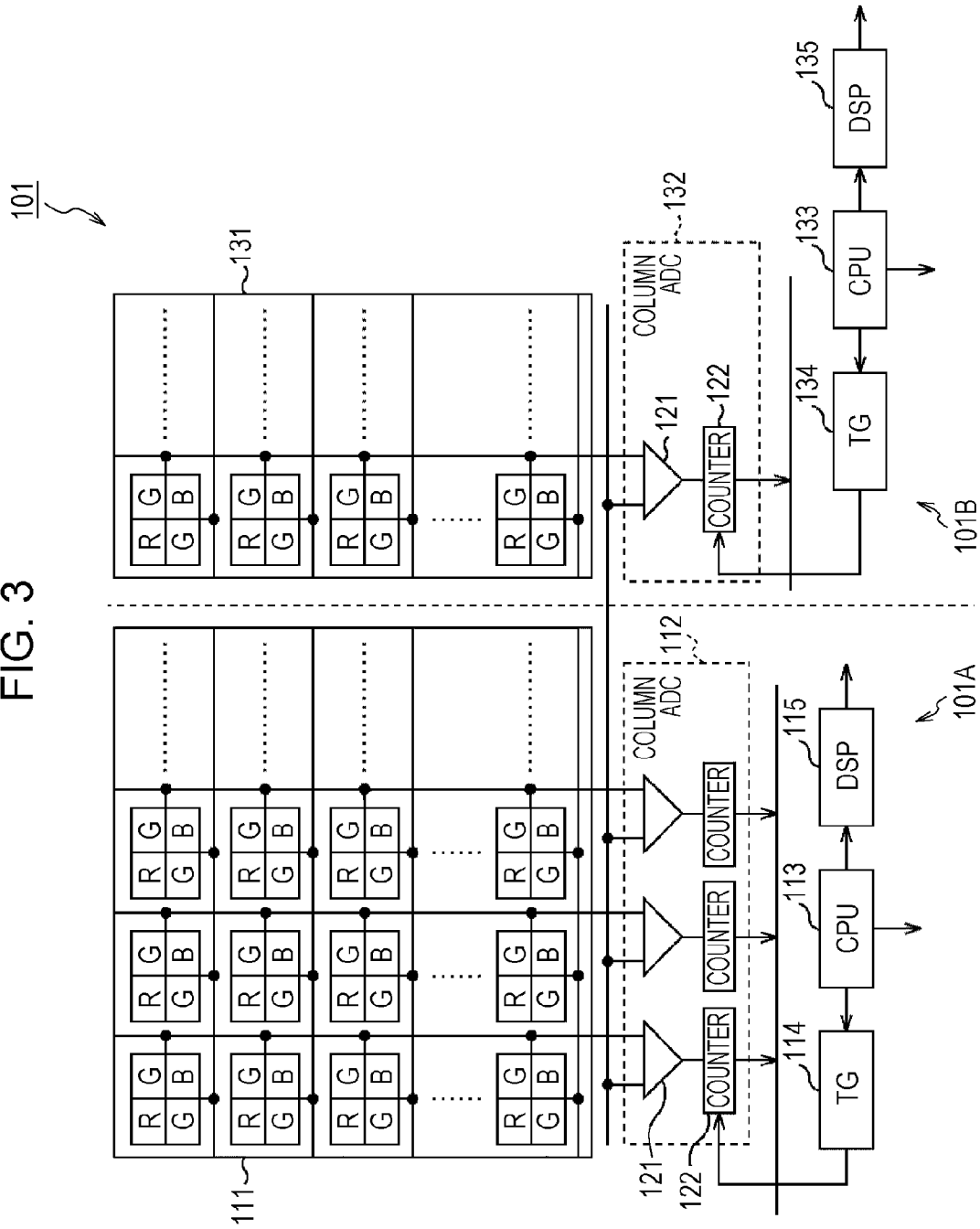
FIG. 3 is a diagram illustrating a principal configuration example of a photoelectric conversion unit.

FIG. 3 is a diagram illustrating a partial configuration example of the photoelectric conversion unit 101. As illustrated in FIG. 3, the imaging unit 101A of the photoelectric conversion unit 101 includes a pixel array unit 111 made up of multiple pixels, a column ADC 112, a CPU 113, a TG 114, and a DSP 115.

With the pixel array unit 111, light received at the light-receiving unit corresponding to the optical system 103 is subjected to photoelectric conversion, and is accumulated as charge. The accumulated charge thereof is read out as an electric signal by the column ADC 112 in accordance with the control of the TG 114 to be controlled by the CPU 113, and converted into digital data. The CPU 113 additionally also controls the DSP 115 and so forth. The column ADC 112 includes a comparator 121 and a counter 122 for each column, and subjects an electric signal read out for each column to A/D conversion.

On the other hand, the sensor unit 101B of the photoelectric conversion unit 101 includes a pixel array unit 131 made up of multiple pixels, a column ADC 132, a CPU 133, a TG 134, and a DSP 135. With the pixel array unit 131, light received at the light-receiving unit corresponding to the optical system 104 is subjected to photoelectric conversion, and is accumulated as charge. The accumulated charge thereof is read out as an electric signal by the column ADC 132 in accordance with the control of the TG 134 to be controlled by the CPU 133, and converted into digital data. The CPU 133 additionally also controls the DSP 135 and so forth. The column ADC 132 includes a comparator 121 and a counter 122 for each column, and subjects an electric signal read out for each column to A/D conversion.

That is to say, the electric signals of the imaging unit 101A and sensor unit 101B are read out as mutually different data by the configurations to be mutually independently driven.

In this manner, the imaging unit 101A and sensor unit 101B are formed using the single photoelectric conversion unit 101, and accordingly, various types of sensing may be performed while suppressing increase in the number of elements. Accordingly, circuit scale and increase in cost may be suppressed. Thus, realization of miniaturization may also be facilitated. Also, increase in consumption power may also be suppressed.

Figure 4:
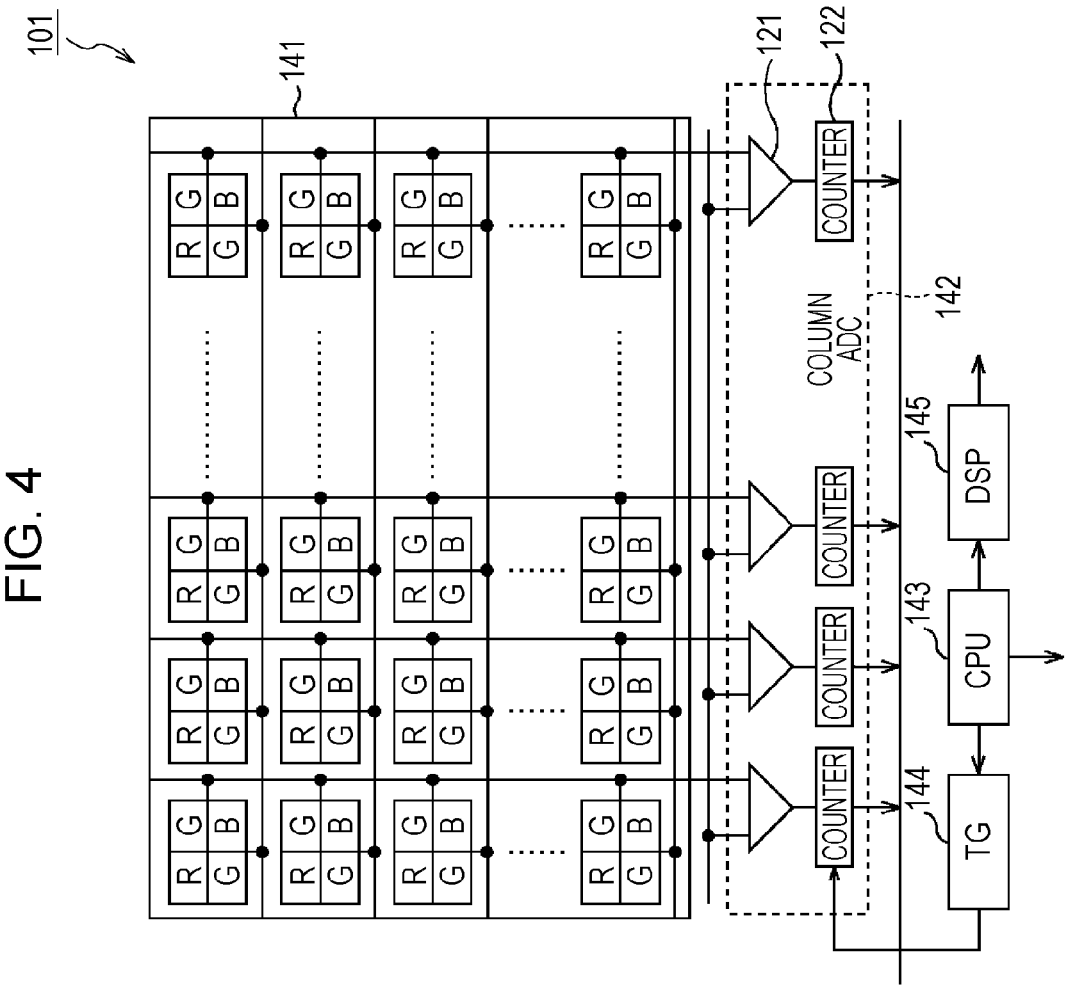
FIG. 4 is a diagram illustrating another configuration example of the photoelectric conversion unit.

Now, as illustrated in FIG. 4, an arrangement may be made wherein the imaging unit 101A and sensor unit 101B are configured as a single pixel array unit 141, and an electric signal corresponding to charge accumulated in the pixel array unit 141 is read out by a readout configuration of one system (column ADC 142, CPU 143, a TG 144, and a DSP 145). That is to say, in this case, the charge subjected to photoelectric conversion and accumulated at the imaging unit 101A, and the charge subject to photoelectric conversion and accumulated at the sensor unit 101B are both read out as electric signals by the column ADC 142 in accordance with the control of the TG 144 to be controlled by the CPU 143, and converted into digital data. The CPU 143 additionally also controls the DSP 145 and so forth.

That is to say, the output of the imaging unit 101A and the output of the sensor unit 101B may be collected as one image data. In this case, the output of the imaging unit 101A and the output of the sensor unit 101B may be distinguished by pixel positions, and accordingly, for example, with image processing on the subsequent stage, one image data may be readily separated into the output of the imaging unit 101A and the output of the sensor unit 101B.

Note that light is propagated through the optical propagation path 105 (e.g., optical fiber) to the sensor unit 101B configured to detect optical features such as illuminance and color temperature and so forth. Therefore, with regard to the area of the sensor unit 101B, it is sufficient to secure no more than the thickness of the optical propagation path 105 (e.g., optical fiber) and a lens with extended width may be omitted. Therefore, the sensor unit 101B may be readily disposed right beside the imaging unit 101A including the optical system 103.

Figure 5:
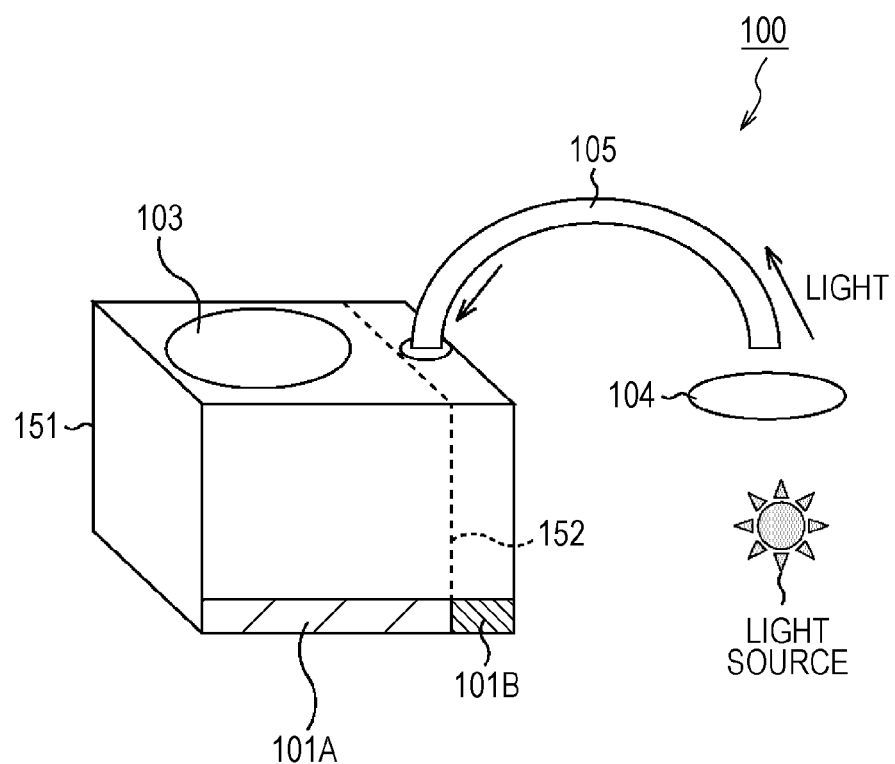
FIG. 5 is a diagram illustrating another configuration example of the photoelectric conversion apparatus.

Note that the photoelectric conversion area where the imaging unit 101A and sensor unit 101B are formed may be shielded against the circumference excluding an optical path from the optical system 103 or optical propagation path 105. FIG. 5 is a diagram illustrating a configuration example of a module element where the photoelectric conversion element has been shielded in such a way.

As illustrated in FIG. 5, the photoelectric conversion area where the imaging unit 101A and sensor unit 101B are formed is covered with a module element 151 made of a material which does not transmit light (high in light blocking effect), and is shielded against exterior thereof. With the module element 151, the optical system 103 and optical propagation path 105 are formed, only light transmitted through the optical system 103 and light propagated through the optical propagation path 105 are input to the interior of the module element 151. That is to say, these lights are principally input to the imaging unit 101A and sensor unit 101B (lights input to the imaging unit 101A and sensor unit 101B become predominant).

Also, as illustrated in FIG. 5, within the module element 151, between the imaging unit 101A and sensor unit 101B may be shielded by a shielding plate 152 made of a material which does not transmit light (high in light blocking effect).

Thus, the photoelectric conversion apparatus 100 may suppress light input the interior of the module element 151 via the optical system 103 from inputting to the sensor unit 101B, or light propagated through the optical propagation path 105 and input to the interior of the module element 151 from inputting to the imaging unit 101A.

That is to say, there may be enabled specifications for multiple applications of imaging application and illuminance/color temperature application in a single photoelectric conversion substrate without increase in the size of the apparatus. Further, pixels for imaging application and pixels for illuminance/color temperature detection application are in divided positions, and accordingly, they individually have a driving circuit, and accordingly, operation may be performed by sensor driving with requisite minimum, which may contribute to reduction in consumption power as compared to a case where the entire imaging device is used for detection of illuminance.

Electronic Device

Figure 6:
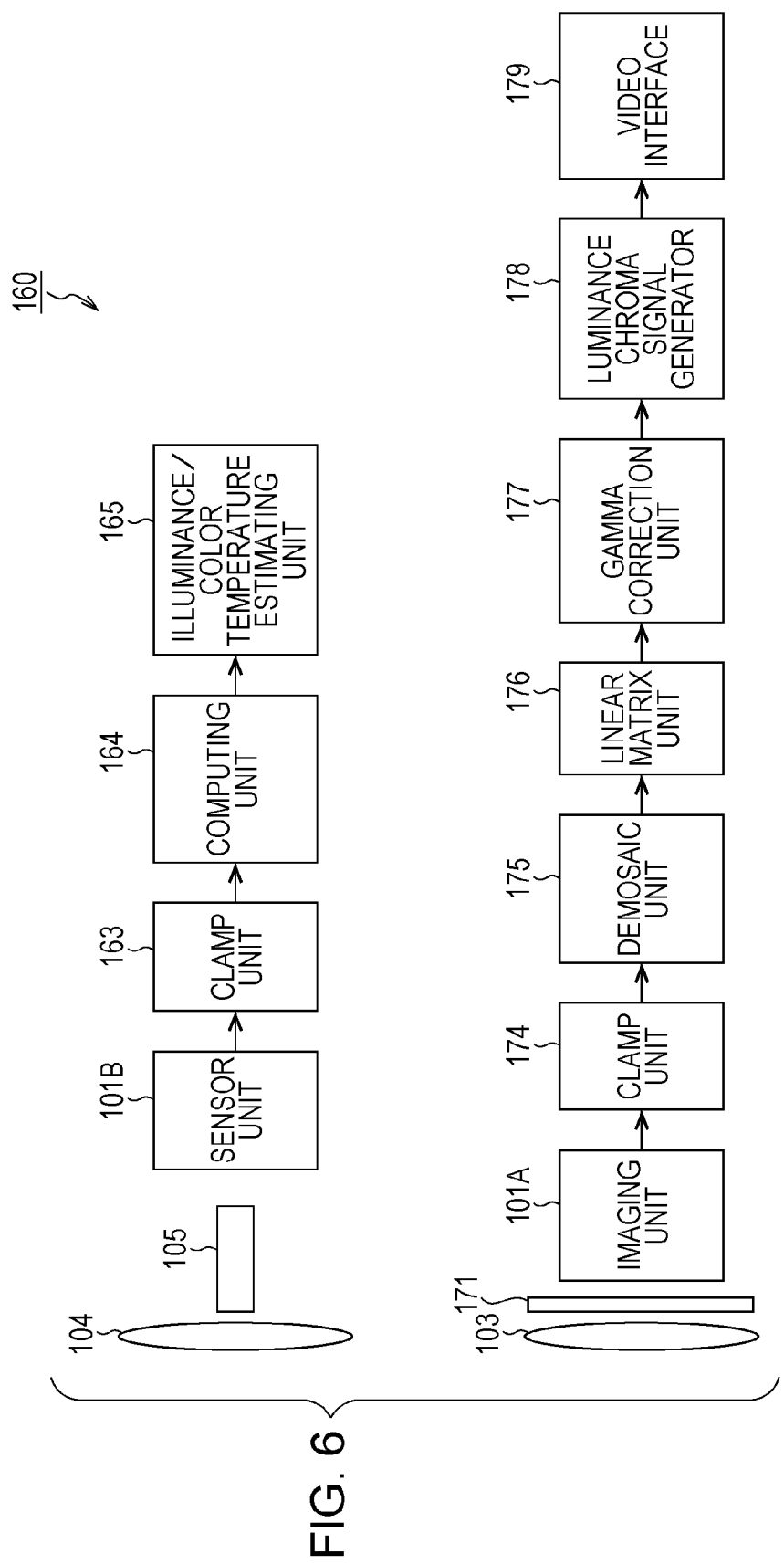
FIG. 6 is a block diagram illustrating a principal configuration example of an electronic device to which the present technology has been applied.

As illustrated in FIG. 3, in the event of mutually independently reading out the output of the imaging unit 101A and the output of the sensor unit 101B, processing on the subsequent stage is also independently performed regarding each as illustrated in FIG. 6.

FIG. 6 is a block diagram illustrating a principal configuration example of an electronic device serving as one mode of an information processing apparatus using the photoelectric conversion apparatus 100. The upper tier in FIG. 6 is a processing unit configured to process the output of the sensor unit 101B. The lower tier in FIG. 6 is a processing unit configured to process the output of the imaging unit 101A.

Light input via the optical system 104 propagates the optical propagation path 105 and is irradiated on the sensor unit 101B. The sensor unit 101B converts the light thereof into an electric signal, and further converts the analog electric signal into a digital value. A clamp unit 163 subtracts the black level of the output of the sensor unit 101B. Further, when the sensor unit 101B has multiple colors such as RGB or the like, a computing unit 164 converts the digital value into a numeric value for obtaining illuminance or color temperature by applying gain to each color value or performing addition/subtraction of each value so as to approximate to human visual perception properties. An illuminance/color temperature estimating unit 165 estimates a desired value such as illuminance or color temperature or the like from numeric value information obtained from the computing unit 164.

Light input via the optical system 103 is irradiated on the imaging unit 101A via an optical filter 171 without propagating the optical propagation path 105. The imaging unit 101A converts the light thereof into an electric signal, and further converts the analog electric signal into a digital value. A clamp unit 174 subtracts the black level of the output of the imaging unit 101A. A demosaicing unit 175 complements a signal for creating a color to each pixel (e.g., complements signals G and B to a red pixel portion), and a linear matrix unit 176 improves reproducibility using RGB information thereof. A gamma correction unit 177 adjusts gamma so as to obtain the optimal value for human visual perception properties and at the time of displaying color signals on the display unit. A luminance chroma signal generator 178 generates luminance components and chroma components. A video interface 179 outputs the luminance components and chroma components.

In this manner, an electronic device 160 may readily subject both of the output of the imaging unit 101A and the output of the sensor unit 101B.

2. Second Embodiment

Photoelectric Conversion Apparatus and Information Processing Apparatus

An example to be used for multiple applications has been illustrated so far, in addition to this, sensor outputs in multiple locations may be obtained with one sensor by employing the optical propagation path 105 (e.g., optical fiber).

For example, in the case of a method disclosed in Japanese Unexamined Patent Application Publication No. 7-35611, multiple fiber lines are used, but there is only one optical system, and obtained data is of light intensity in one location alone. Also, with Japanese Unexamined Patent Application Publication No. 2002-214039, it is disclosed that optical fiber lines are provided in multiple locations, and accordingly, light intensities may be individually obtained regarding the multiple locations. In the case of this technology, in order to obtain the light intensity of each optical fiber line, fiber lines other than a target fiber line had to be shielded with a shutter or the like. That is to say, in the event of attempting to obtain the light intensities of all of the fiber lines, shielding on/off has individually to be repeated in order, the outputs of all of the fiber lines were not able to be obtained with one-time sensor output, and accordingly, there is concern that high-speed operation will be difficult. Further, a shutter unit has to be individually provided for each fiber line, and there is concern that costs and volumes of the shutter units themselves will increase.

Therefore, a photoelectric conversion apparatus is configured so as to include multiple optical propagation paths configured to propagate light, and a photoelectric conversion element configured to subject light propagated through each of the multiple optical propagation paths to photoelectric conversion in mutually different partial areas in the photoelectric conversion area.

A point different from the first embodiment is in that multiple optical propagation paths are provided, and the photoelectric conversion element subjects light propagated through each optical propagation path to photoelectric conversion. That is to say, with the photoelectric conversion element, lights received at multiple light-receiving units provided in an optional position and direction may mutually individually be subjected to photoelectric conversion. Accordingly, increase in the number of elements may be suppressed, and also design may be facilitated. That is to say, reduction in the size of the photoelectric conversion apparatus is facilitated, and increase in cost and consumption power may be suppressed. Also, reduction in reliability may also be suppressed.

In the same way as with the first embodiment, each optical propagation path is made of a predetermined substance, and light may propagate the interior of the substance thereof. For example, the optical propagation paths may also be realized as optical fibers made of quartz glass.

In addition to the above-mentioned configuration of the photoelectric conversion apparatus, there may be employed an information processing apparatus including an estimating unit configured to estimate illuminance or color temperature using an electric signal corresponding to light propagated through each optical propagation path.

In the same way as with the first embodiment, an electric signal subjected to photoelectric conversion at the photoelectric conversion apparatus may be used in any way. For example, an electric signal obtained by subjecting light propagated through each optical propagation path to photoelectric conversion may be taken as optical sensor output. Thus, with the information processing apparatus (electronic device), increase in the number of elements may be suppressed. That is to say, with the information processing apparatus, reduction in the size of the apparatus is facilitated, and also, multiple optical sensor outputs (estimation results) may be obtained while suppressing increase in cost and consumption power and decrease in reliability.

Note that the information processing apparatus may further include a control unit configured to control execution of processing based on optical features such as illuminance or color temperature estimated by the estimating unit. Thus, the information processing apparatus may perform processing according to an optical environment in the vicinity of the apparatus.

Also, the information processing apparatus may further include an operation accepting unit configured to accept user operations based on optical features such as illuminance or color temperature estimated by the estimating unit, and the control unit may control execution of processing in accordance with user operations accepted by the operation accepting unit.

For example, when a user traces a casing where multiple light-receiving units are provided by a finger, the light-receiving units are temporarily shielded by the finger thereof. That is to say, according to the user operations, optical features of light received at each light-receiving unit are changed. The operation accepting unit detects and analyzes this change, thereby identifying the user operation, and identifying an instruction (command) corresponding to the operation thereof. The control unit controls execute of predetermined processing in accordance with the instruction thereof. This predetermined processing is optional. For example, the power may be turned on or off, or an application may be activated or terminated. Also, for example, in the event that the information processing apparatus is a cellular phone, a call may be started or ended.

Thus, the information processing apparatus may accept the user operation using sensor output to perform control corresponding the operation thereof.

Also, the information processing apparatus may further include a detecting unit configured to detect a position based on optical features such as illuminance or color temperature estimated by the estimating unit, and the control unit may control execution of processing according to a position detected by the detecting unit. For example, the detecting unit identifies an optical environment in the vicinity of the information processing apparatus from the detected illuminance and color temperature and so forth, and detects the position from the optical environment such that which room (space) the information processing apparatus exists. The control unit performs control of processing according to the detected position thereof. Thus, the information processing apparatus may control execution of processing according to the position thereof. This processing is optional.

Also, the detecting unit may also detect, from change in the estimated optical features, change in the position. The control unit may also control execution of processing based on change in the position thereof. For example, the control unit compares the color temperature of light received at the light-receiving unit detected by the detecting unit with the color temperature of illumination of each room, thereby identifying a room where the information processing apparatus is positioned to execute processing according to the position thereof. Thus, control according to the position of the information processing apparatus may be performed. Further, the control unit may control execution of processing based on temporal change in the optical features such as illuminance or color temperature estimated by the estimating unit. For example, when the information processing apparatus (electronic device) is stored in a bag or the like, the optical features of lights received at the multiple light-receiving units are changed with a predetermined pattern. The detecting unit identifies this pattern, thereby detecting that the casing has been stored in a bag or the like. The control unit executes processing according to change in a state thereof, for example, such that the display is turned off, or the like. Thus, control according to change in situation may be performed.

Further, the information processing apparatus may further include a display unit configured to display information, and the control unit may control the luminance of the display unit based on optical features such as illuminance or color temperature estimated by the estimating unit. Thus, for example, the luminance of the display unit may be adjusted according to brightness or the like of the periphery of the information processing apparatus (electronic device), and display easy viewable for a user may be realized.

Also, the information processing apparatus may further include an emission unit configured to emit light, and the optical propagation path may propagate light output from the emission unit thereof in a direction opposite to light to be subjected to photoelectric conversion. Thus, light may also be emitted from the light-receiving unit, and the light-receiving unit may also be used as a message output unit (display unit). That is to say, functions may be increased without increasing the number of elements.

Note that the above-mentioned configuration of the information processing apparatus may be realized as a method (information processing method).

Photoelectric Conversion Apparatus

A more specific example will be described. FIGS. 7A and 7B are diagrams illustrating another configuration example of a photoelectric conversion apparatus to which the present technology has been applied. In the case of an example in FIG. 7A, a photoelectric conversion apparatus 180 includes a single sensor unit 181, and multiple optical propagation paths 105 provided to the sensor unit 181 thereof. In FIG. 7A, though six optical propagation paths of optical propagation paths 105-1 to 105-6 are illustrated, this number of optical propagation paths is optional. Also, in the event that description may be made without mutually distinguishing the optical propagation paths 105-1 to 105-6, hereinafter, these will simply be referred to as optical propagation paths 105. That is to say, each of these optical propagation paths 105-1 to 105-6 is the same as the optical propagation path 105 described with reference to FIG. 2 and others.

As illustrated in FIG. 7A, an arrangement is made wherein lights propagated through the optical path propagation paths 105 are irradiated on mutually different partial areas of a photoelectric conversion area of the sensor unit 181. The sensor unit 181 is one mode of a photoelectric conversion element configured to subject light to photoelectric conversion, and has a photoelectric conversion area where light is converted into an electric signal, on the light-receiving surface where light is irradiated. This photoelectric conversion area is an area where a photodiode, an organic photoelectric conversion film, and so forth are formed. The sensor unit 181 subjects lights propagated through the optical propagation paths 105 to photoelectric conversion in mutually different partial areas (positions) of this photoelectric conversion area.

That is to say, the sensor unit 181 is the same element as the photoelectric conversion unit 101 in FIG. 2, but subjects only lights propagated through the optical propagation paths 105 to photoelectric conversion. As described above, it may frequently be difficult to obtain an image from the lights propagated through the optical propagation paths 105. Accordingly, hereinafter, let us say that the sensor unit 181 employs an electric signal obtained by photoelectric conversion for detection (sensor) of optical features. However, as described above, usage of an electric signal obtained at the sensor unit 181 is not restricted to this but optional.

A pixel array of the sensor unit 181 is, as illustrated in FIG. 7B, divided into multiple partial areas (nine areas of partial areas 181-1 to 181-9 in the case of an example in FIG. 7B), and readout of charge may independently be performed for each partial area thereof. Lights propagated through the optical propagation paths 105 are irradiated on mutually different partial areas of this partial area group. Note that the number of the partial areas is optional as long as the number is equal to or greater than the number of the optical propagation paths 105. Note that, in the same way as with the case in FIG. 4, charges (electric signals) of all of the partial areas may be read out as one group data from the readout unit in one system. Even with such a case, data of each partial area may be identified based on coordinates of a pixel, and accordingly, the data thereof may be readily separated into data for each partial area at a processing unit on the subsequent stage.

Note that, in the same way as with the case in FIG. 2, the optical propagation paths 105 are provided, and accordingly, flexibility of a position where light is received is improved. That is to say, the sensor unit 181 may measure illuminance or color temperature in optional multiple positions. For example, the sensor unit 181 may subject lights received in multiple positions away from the sensor unit 181 of the casing of the photoelectric conversion apparatus 180 to photoelectric conversion. Also, these light-receiving positions may mutually be separated. That is to say, light sources of lights that the optical propagation paths 105-1 to 105-6 propagate do not have to be the same.

Figure 8C:
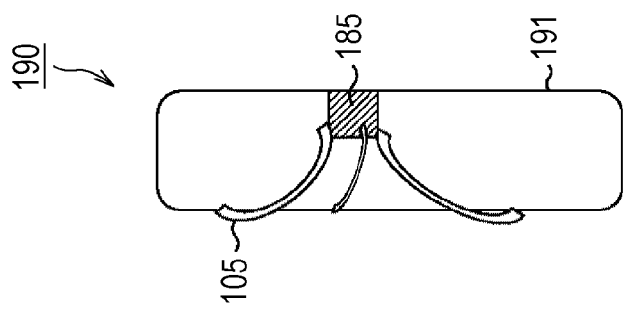
FIGS. 8A-8C are diagrams illustrating another configuration example of the electronic device to which the present technology has been applied.
Figure 8B:
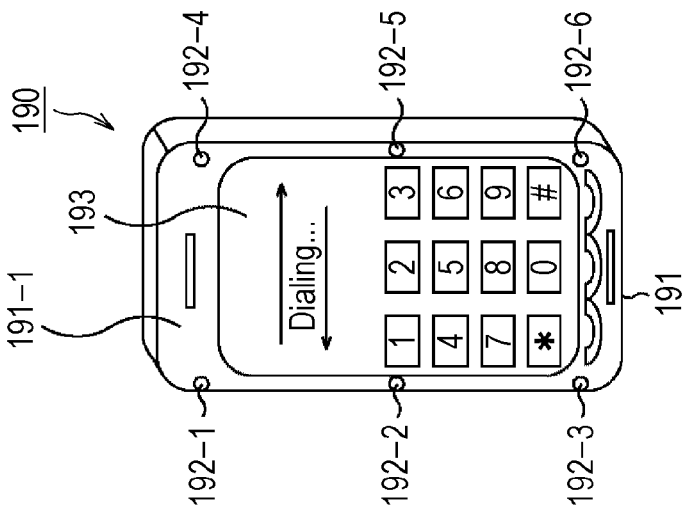
Figure 8A:
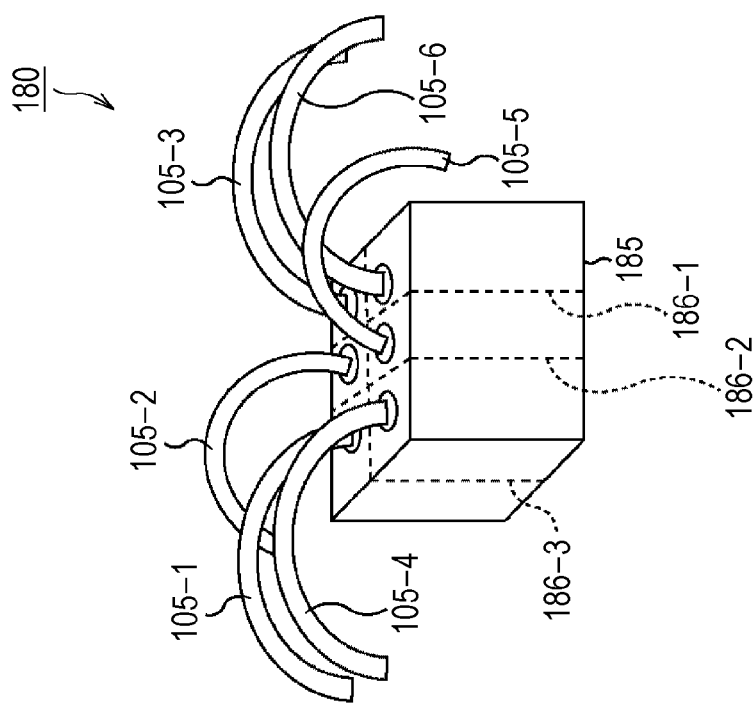

Also, in the same way as with the case in FIG. 5, as illustrated in FIG. 8A, the photoelectric conversion area of the sensor unit 181 is covered with a module element 185 made of a material which does not transmit light (high in light blocking effect) so as to shield the circumference excluding the optical paths from the optical propagation paths 105. Also, in the same way as with the case in FIG. 5, between partial areas where lights propagated through the optical propagation paths 105 are irradiated may mutually be shielded by shielding plates 186-1, 186-2, and 186-3.

Electronic Device

The edges (i.e., light-receiving units) of the optical propagation paths 105 on the opposite side of the sensor unit 181 may be provided in an optional position of the photoelectric conversion apparatus 180 or an imaging processing apparatus (electronic device) having the configuration of the photoelectric conversion apparatus 180, for example. For example, as illustrated in FIG. 8B, sensor openings 192-1 to 192-6 which are light-receiving units may be provided so as to surround the circumference of a display 193 provided to a front face 191-1 of a casing 191 of an electronic device 190 having the configuration of the photoelectric conversion apparatus 180. In this case, the module element 185 including the sensor unit 181 may be provided in an optional position. For example, as illustrated in a cross-sectional view as viewed from the lateral face of the casing 191, in FIG. 8C, the module element 185 may also be provided to the rear side within casing 191.

In this manner, the sensor openings 192 which are light-receiving units may be provided in an optional position, and accordingly, design flexibility of the electronic device 190 is improved, which contributes to reduction in size. Further, the sensor openings 192 are provided in multiple positions, and accordingly, even when local direct light is input to only a particular sensor opening (light-receiving unit), other sensor openings are not influenced. At this time, an illuminance/color temperature sensor which is not influenced from locally external light may be realized by averaging all of outputs or excluding outliers due to direct light.

In the case of the related art, as illustrated in FIG. 9A, light received at one light-receiving unit is irradiated on one sensor, and accordingly, one sensor output (e.g., illuminance output) alone may be obtained, but in the case of the photoelectric conversion apparatus 180, multiple lights received at the multiple light-receiving units are, as illustrated in FIGS. 9A and 9B, irradiated on mutually different areas (areas 195-1 to 195-6), and accordingly, multiple sensor outputs (e.g., illuminance outputs) may be obtained at the sensor unit 181 at the same time.

FIG. 10 is a block diagram illustrating a principal configuration example of the electronic device 190 having the configuration of the photoelectric conversion apparatus 180. As illustrated in FIG. 10, the electronic device 190 includes a control unit 201, an input unit 211, a display unit 212, an output unit 213, a storage unit 214, a communication unit 215, a drive 216, and an illuminance/color temperature measuring unit 231.

The control unit 201 includes, for example, a Central Processing Unit (CPU), Read Only Memory (ROM), Random Access Memory (RAM) and so forth, controls the other units, and performs processing relating to control of the processing units of the photoelectric conversion apparatus 180. For example, the CPU of the control unit 201 executes various types of processing in accordance with a program stored in the ROM. Also, the CPU executes various types of processing in accordance with a program loaded to the RAM from the storage unit 214. Data and so forth used for the CPU executing various types of processing are also stored in the RAM as appropriate.

The input unit 211 made up of a keyboard, a mouse, a touch panel, and so forth is connected to the control unit 201. The display unit 212 made up of a cathode ray tube (CRT) display, an Liquid Crystal Display (LCD), an organic EL display (also written as "GELD" for "Organic Electro Luminescence Display") or the like, and the output unit 213 made up of a speaker, an output terminal, and so forth are also connected to the control unit 201.

The storage unit 214 made up of an solid state drive (SSD) such as flash memory or the like, a hard disk, and so forth is also connected to the control unit 201. The communication unit 215 made up of a cable local area network (LAN) or wireless LAN interface, a modem, and so forth is also connected to the control unit 201. The communication unit 215 performs communication processing via a network including the Internet.

The drive 216 is further connected to the control unit 201 as appropriate, and a removable medium 221 such as a magnetic disk, an optical disc, a magneto-optical disc, semiconductor memory, or the like is mounted on the drive 216 thereof as appropriate. A computer program read out from the removable medium 221 via the drive 216 thereof is installed in the storage unit 214 as appropriate.

The illuminance/color temperature measuring unit 231 performs processing relating to measurement of illuminance or color temperature in accordance with the control of the control unit 201. As illustrated in FIG. 10, the illuminance/color temperature measuring unit 231 includes a clamp unit 242, a computing unit 243 according to area, and an illuminance/color temperature estimating unit 244 in addition to the above-mentioned sensor openings 192, optical propagation paths 105, and sensor unit 181.

The sensor unit 181 subjects lights propagated through the optical propagation paths 105 to photoelectric conversion in mutually different partial areas of the photoelectric conversion area, subjects these to A/D conversion, combines (connects) these, and outputs this as one data corresponding to the entire photoelectric conversion area.

The clamp unit 242 subtracts a black level of digital image data to be supplied from the sensor unit 181.

The computing unit 243 according to area divides image data to be supplied from the clamp unit 242 for each partial area where light propagated through each of the optical propagation paths 105 is subjected to photoelectric conversion. That is to say, the computing unit 243 according to area divides one image data for every multiple partial areas based on coordinates, thereby generating luminance data for each light propagated through each optical propagation path 105. For example, the computing unit 243 according to area calculates a representative value for each divided partial area. For example, the computing unit 243 according to area calculates an average value of luminance values regarding each of the partial areas, and takes the average value thereof as a representative value of the partial area thereof. In the event that outputs are RGB signals, for example, a representative value may be calculated such as "illuminance=ωGreen+αBlue+σRed" (ω, α, and σ are optional numbers, which take both of a positive value and a negative value). Other calculating methods may be employed.

The illuminance/color temperature estimating unit 244 estimates illuminance or color temperature using luminance data for each light thereof. In order to estimate illuminance or color temperature, these multiple values may be averaged, or as described above, averaging may be performed after excluding outliers (e.g., a value equal to or greater than twice the mean value), or the values may be added together after performing weighting on the value of an area intended to selectively obtain luminance (e.g., near the display of the electronic device). The illuminance/color temperature estimating unit 244 supplies the obtained estimated value of illuminance or color temperature to the control unit 201. Note that the illuminance/color temperature estimating unit 244 may output individual output to the control unit 201 as a signal having performed neither averaging nor adding together.

Description will be made regarding an example of flow of illuminance/color temperature measurement processing to be executed by the illuminance/color temperature measuring unit 231, with reference to the flowchart in FIG. 11.

Upon the processing being started, in step S201 the sensor unit 181 receives light at each sensor opening, and subjects light supplied via each optical propagation path 105 to photoelectric conversion in each partial area of the photoelectric conversion area.

In step S202, the sensor unit 181 subjects the analog signal obtained by the processing in step S201 to A/D conversion, mutually combines (connects) the obtained digital data corresponding to each partial area, and outputs this as data of the entire photoelectric conversion area.

In step S203, the clamp unit 242 subtracts a black level from the digital value obtained by the processing in step S202.

In step S204, the computing unit 243 according to area divides the digital value obtained by the processing in step S203 for each partial area. Also, the computing unit 243 according to area subjects the obtained data for each partial area to predetermined signal processing as appropriate to calculate a representative value for each partial area, for example.

In step S205, the illuminance/color temperature estimating unit 244 performs estimation of illuminance or color temperature using the data for each partial area obtained in step S204. Information obtained by this processing is supplied to the control unit 201.

In this manner, the illuminance/color temperature measuring unit 231 may readily measure illuminance or color temperature regarding lights from the multiple sensor openings.

The control unit 201 controls the illuminance/color temperature measuring unit 231 not only to measure illuminance or color temperature as described above but also to perform control of the units of the electronic device 190 based on the obtained illuminance or color temperature.

Figure 12:
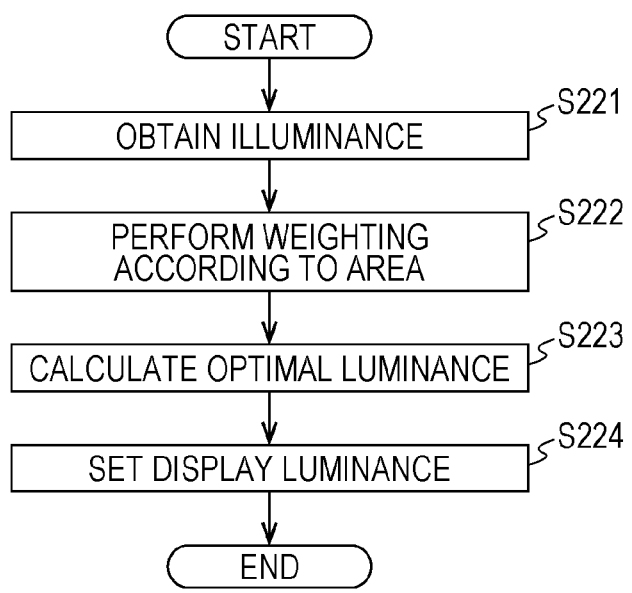
FIG. 12 is a flowchart for describing an example of flow of display luminance control processing.

For example, the control unit 201 adjusts the luminance of the display 193 based on the obtained illuminance or color temperature. An example of flow of such luminance adjustment processing will be described with reference to the flowchart in FIG. 12.

In step S221, the control unit 201 obtains illuminance (or color temperature) from the illuminance/color temperature measuring unit 231.

In step S222, the control unit 201 performs weighting so as to increase weighting for a value on a side nearer the display 193 (e.g., performs double the weighting on outputs of the sensor openings 2 and 5 in FIG. 8B).

In step S223, the control unit 201 adds these values together to estimate the optimal luminance value of the display 193. An estimating method thereof is to store the optimal luminance value in the memory according to an obtained value beforehand, for example.

In step S224, the control unit 201 controls the display unit 212 to reflect the luminance value obtained by the processing in step S223 on the luminance of the display 193 of the display unit 212.

In this manner, the control unit 201 may readily control the luminance of the display 193 in a more suitable manner based on lights obtained at the multiple sensor openings.

As another embodiment for controlling display luminance, for example, it may also be conceived that brightness of the display itself is changed for each position based on illuminance information for each position of the electronic device 190. For example, display luminance increases regarding a location nearer the sensor where the obtained illuminance value is high. In the case of an organic EL display, individual pixels are controlled with current. Also, in the case of liquid crystal, this may be realized by changing brightness of multiple backlights for each position, or the like.

Further, the sensor openings may be employed as a user interface other than display luminance control. For example, with the electronic device 190 in FIG. 8B, in the event that illuminance has been changed from bright to dark at the sensor openings 192-1, 192-2, and 192-3 in order, determination is made that the sensor openings 192 have been traced by a finger to execute a particular operation at the electronic device 190 (e.g., in the case of a phone, the phone is hung up).

Figure 13:
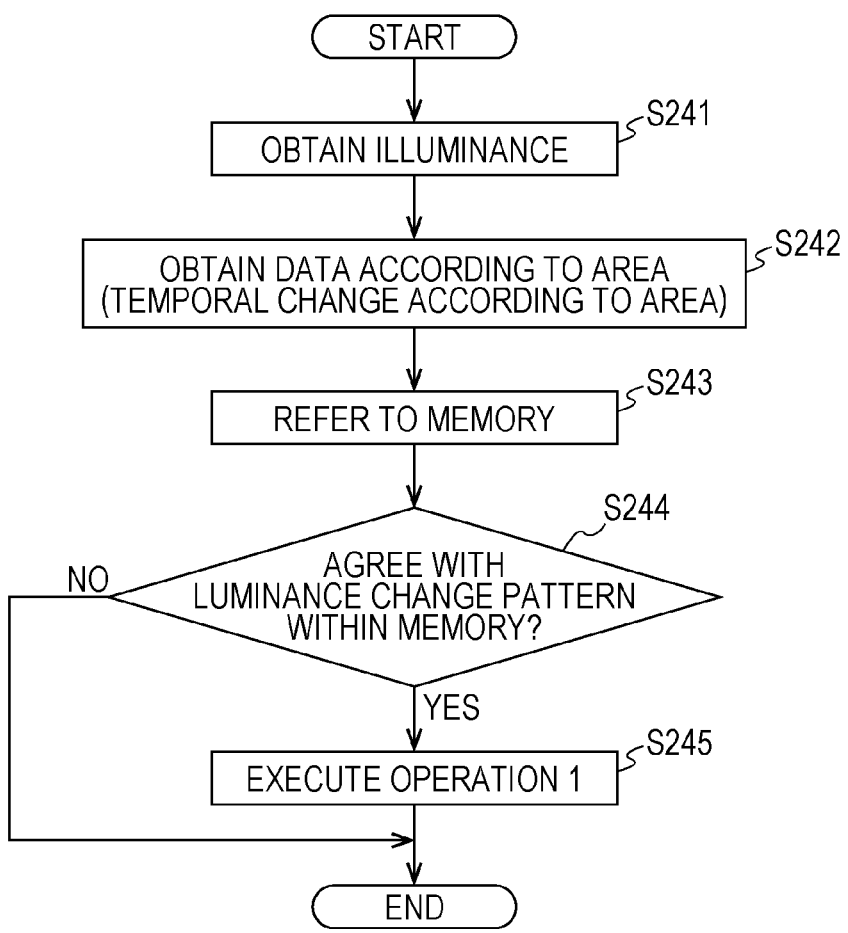
FIG. 13 is a flowchart for describing an example of flow of execution control processing.

An example of flow of such input acceptance processing will be described with reference to the flowchart in FIG. 13.

Upon the processing being started, in step S241 the control unit 201 obtains illuminance (or color temperature) from the illuminance/color temperature measuring unit 231.

In step S242, the control unit 201 obtains this data in temporal sequence, and obtains temporal change of each of multiple sensors.

In step S243, the control unit 201 compares a pattern of this temporal change with a pattern registered beforehand in the memory.

In step S244, the control unit 201 determines whether or not both agree in the comparison in step S243. In the event that determination is made that both agree, the processing proceeds to step S245.

In step S245, the control unit 201 executes a particular operation (processing) according to the pattern of the temporal change thereof. Upon the processing in step S245 being ended, this input acceptance processing is ended.

Also, in the event that determination is made in step S244 that both do not agree, the processing in step S245 is omitted, and this input acceptance processing is ended.

As described above, the control unit 201 may readily accept user operations based on lights obtained at the multiple sensor openings.

Also, a manner of behavior of putting an electronic device into a bag or pocket is determined other than tracing by a finger, and in response to this behavior, operation to turn off the power or the like may be executed, for example. At the time of putting the device into a bag or pocket, illuminance suddenly deteriorates. Further, speaking of the sensor openings 192 in FIG. 8B, when putting the device into a bag or pocket, the sensor openings 192 are consecutively darkened on a coordinates system.

Figure 14:
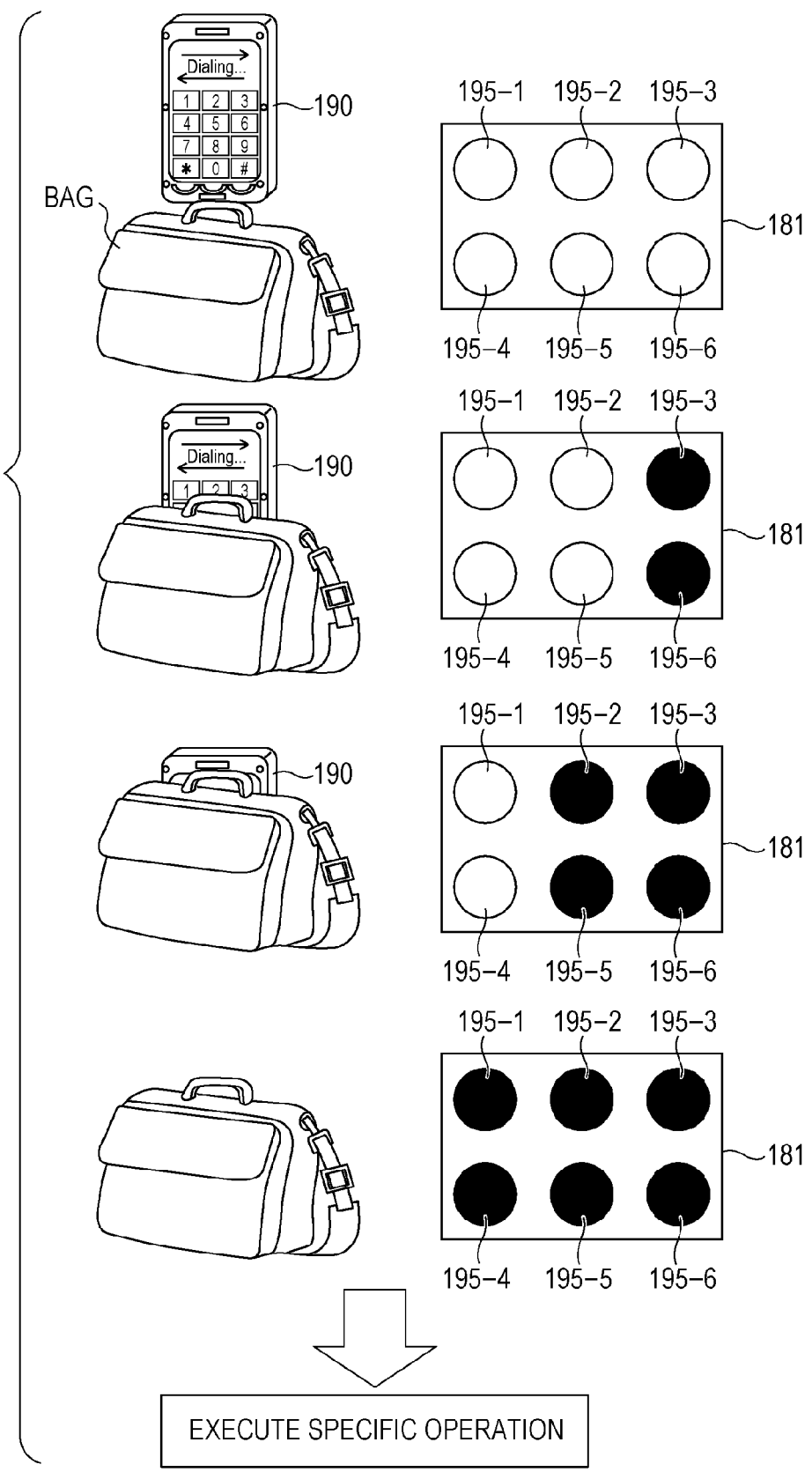
FIG. 14 is a diagram for describing an example of a scene of detection of change in a situation.

An example of this scene is illustrated in FIG. 14. For example, in the event of putting the electronic device 190 into a bag from the lower face thereof, the sensor openings are rapidly darkened in order of the sensor openings 192-3, 6→sensor openings 192-2, 5→sensor openings 192-1, 4. An arrangement may be made wherein such a particular estimated pattern is registered beforehand, and an operation is executed (such as turning off the power).

With a sensor having a single point according to the related art as illustrated in FIGS. 1A and 1B, such control is not realized. For example, a signal pattern obtained at the time of putting the electronic device into a bag, and a signal pattern obtained at the time of a room going black due to having turned off the light switch, are the same. That is to say, such a sensor is not usable for determining whether or not the device has been put into a bag.

Figure 15:
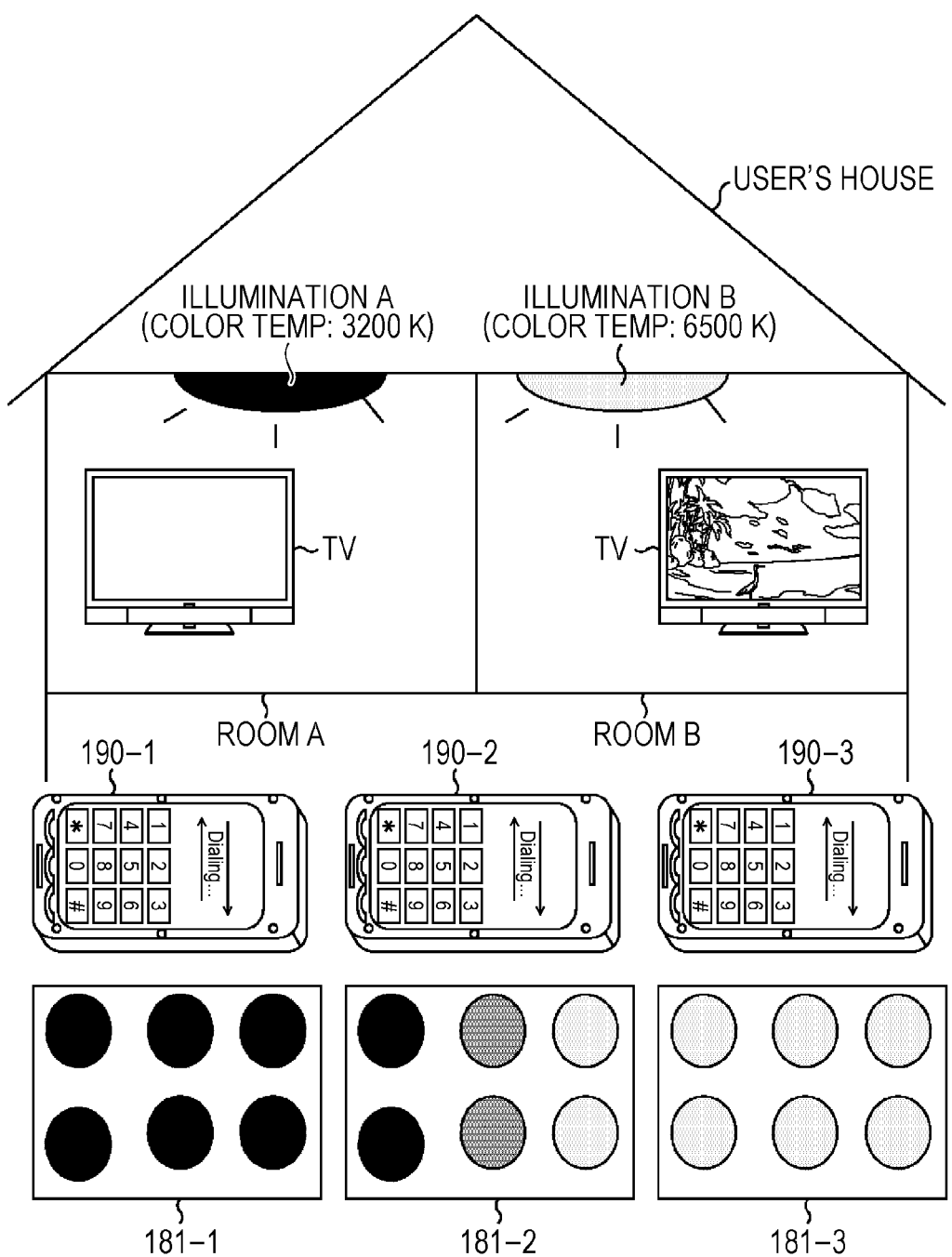
FIG. 15 is a diagram for describing an example of a scene of detection of an environment.

Also, optical features are not restricted to illuminance, and color temperature may be employed. FIG. 15 illustrates an example thereof. In the event that color temperature of a lighting apparatus differs depending on rooms, the color temperature of each room at home is registered in the electronic device 100 beforehand. Registration of color temperature is performed by obtaining outputs of color pixels (e.g., RGB pixels) that the electronic device 190 has at each room.

For example, color temperature is 3200K in a room A in FIG. 15, and light of wavelength on the red side is strong. On the other hand, color temperature is 6500K in a room B, and light of wavelength on the blue side is strong. That is to say, for example, sensitivity ratios of R/G, and B/G in reach room are registered in the memory beforehand, whereby a room where the user exists (a room where the electronic device 190 is positioned) may be identified by comparing sensitivity ratios of outputs obtained from the sensor (the position of each case of the electronic devices 190-1 to 190-3 may be identified).

Also, in the event that the user exists in a place where both lights of the rooms A and B are input, if a multi-point sensor according to the present technology is employed, it may be distinguished which room the electronic device 190 faces. In the case of a central example in FIG. 15, sensor output of the tip portion of the electronic device 190 is similar to the sensitivity ratio at the time of 6500K, and sensor output of the lower portion of the electronic device 190 is similar to the sensitivity ratio at the time of 3200K. That is to say, it is found that the electronic device 190 faces the direction of the room B.

The place where the electronic device 190 exists and direction thereof are found, whereby an application suitable for the room thereof may automatically be displayed on the screen, for example.

Figure 16:
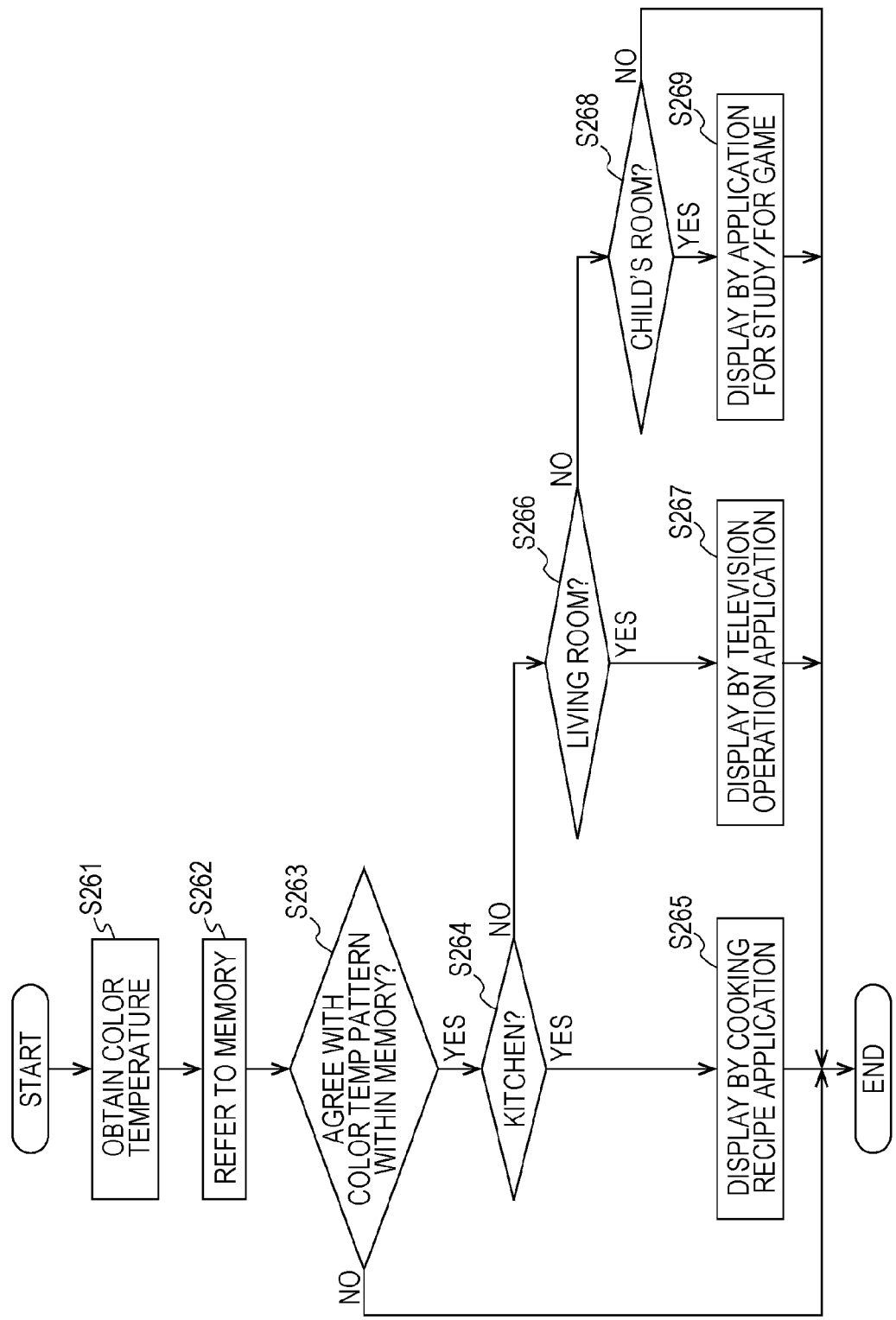
FIG. 16 is a flowchart for describing an example of flow of control processing.

An example of flow of such control processing will be described with reference to the flowchart in FIG. 16.

Upon the processing being started, in step S261 the control unit 201 obtains color temperature (or illuminance) for each partial area from the illuminance/color temperature measuring unit 231.

In step S262, the control unit 201 compares the pattern of color temperature for each area with a pattern registered beforehand in the memory.

In step S263, the control unit 201 determines whether or not both agree in the comparison in step S262. In the event that determination is made that both do not agree, this control processing is ended.

Also, in the event that determination is made in step S263 that both agree, the processing proceeds to step S264. In step S264, the control unit 201 determines whether or not the position of the current electronic device 190 is in a kitchen based on the pattern of color temperature that agreed thereof.

In the event that determination is made that the position is in a kitchen, the processing proceeds to step S265. In step S265, the control unit 201 controls the display unit 212 to display an image to be generated, for example, by a cooking recipe application (i.e., the control unit 201 causes the display 193 to display information according to the current position (kitchen)) on the display 193.

Upon the processing in step S265 being ended, this control processing is ended. Also, in the event that determination is made in step S264 that the current position of the electronic device 190 is not in a kitchen, the processing proceeds to step S266.

In step S266, the control unit 201 determines whether or not the position of the current electronic device 190 is in a living room based on the pattern of color temperature that agreed in the processing in step S263.

In the event that determination is made that the position is in a living room, the processing proceeds to step S267. In step S267, the control unit 201 controls the display unit 212 to display an image to be generated, for example, by a television operation application (i.e., the control unit 201 causes the display 193 to display information according to the current position (living room)) on the display 193.

Upon the processing in step S267 being ended, this control processing is ended. Also, in the event that determination is made in step S266 that the current position of the electronic device 190 is not in a living room, the processing proceeds to step S268.

In step S268, the control unit 201 determines whether or not the position of the current electronic device 190 is in a child room based on the pattern of color temperature that agreed in the processing in step S263.

In the event that determination is made that the position is in a child room, the processing proceeds to step S269. In step S269, the control unit 201 controls the display unit 212 to display an image to be generated, for example, by an application for study/game (i.e., the control unit 201 causes the display 193 to display information according to the current position (child room)) on the display 193.

Upon the processing in step S269 being ended, this control processing is ended. Also, in the event that determination is made in step S268 that the current position of the electronic device 190 is not in a child room, this control processing is ended.

As described above, the control unit 201 may more readily accurately control the display of the display 193 based on the color temperature of lights obtained at the multiple sensor openings. For example, with a GPS according to the related art or the like, radio waves are not readily received indoors, and also, distinguishing between rooms on different floors is not realizable, but by applying the present technology the display of the display 193 may more readily accurately be controlled without employing GPS. It goes without saying that similar control may also be performed based on illuminance.

Emission Element

Figure 17:
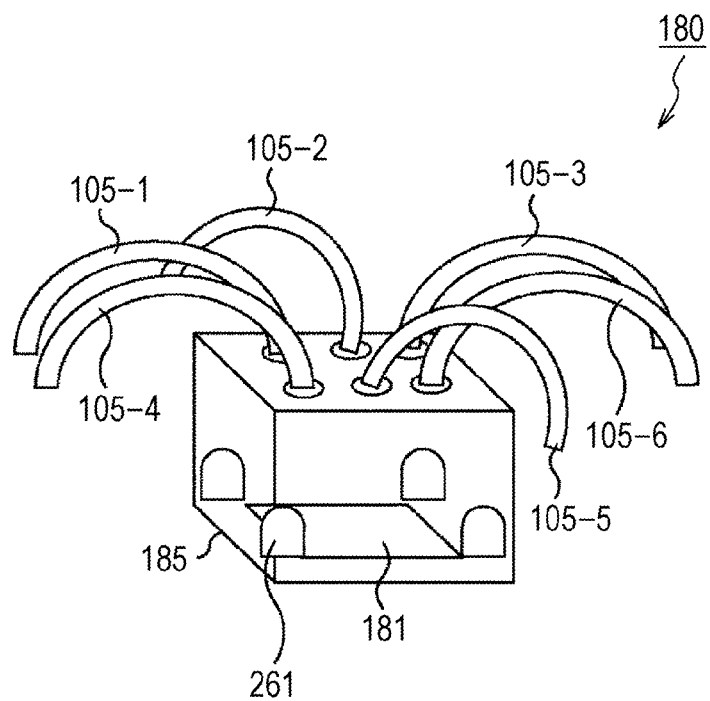
FIG. 17 is a diagram illustrating yet another configuration example of the photoelectric conversion apparatus to which the present technology has been applied.

An emission element may be provided to the inside of the module element 185 described above. The optical propagation paths 105 (e.g., optical fiber) may externally acquire light, and also may also externally discharge light. According to this being taken into consideration, not only a light-receiving element but also emission elements 261 may be provided within the module element 185 as illustrated in FIG. 17.

In this case, an arrangement may be made wherein at the time of normal reception of light (photoelectric conversion by the sensor unit 181), the control unit 201 uses the emission elements 261 in an off state, and causes the emission elements 261 to emit light only when a particular situation comes. For example, in the case that the electronic device 190 is a cellar phone, the control unit 201 causes the emission elements 261 to emit light at the time of incoming of the phone. Thus, the sensor openings (light-receiving units) 192 in FIG. 8B emits light, and accordingly, the user may be informed of an incoming state by light. Also, the control unit 201 may cause only a part of the emission elements 261 to emit light instead of all of the emission elements 261 in FIG. 17 to light only a part of the optical propagation paths 105.

For example, at the time of this, other optical propagation paths 105 may be used for reception of light. In other words, emission and light reception may be performed with one module element 185 at the same time. At this time, in order to suppress light of the emission elements 261 from directly leaking in the photoelectric conversion area of the sensor unit 181 where light is being received, for example, (emission portion of) the emission elements 261 is brought closer to the optical propagation paths 105 as much as possible so as not to be scattered in the direction of the sensor unit 181 (e.g., FIG. 18C), or the light-receiving surface (portion of the photoelectric conversion area where photoelectric conversion is performed) of the sensor unit 181 may be shielded so as to suppress entrance of the light of the emission elements 261 to the light-receiving surface of the sensor unit 181. Thus, for example, light emitted at the emission element 261 is irradiated on an object via the optical propagation path 105 for emission and the sensor opening 192, reflected light thereof may be detected (photoelectric conversion) at the sensor unit 181 via the sensor opening 192 (light-receiving unit) for reception of light and the optical propagation path 105. For example, at the time of handling the electronic device in a dark place, the sensor openings 192-1, and 4 in FIG. 8B are subjected to infrared emission, for example. The sensor openings 192-2, 3, 5, and 6 are used for reception of light, and output is obtained from the sensor unit 181. Thus, change in light (infrared) may be detected as described above even in a dark place, and a particular operation (such as turning off the power) may be executed.

Propagation Path

As described above, with the present technology, light is propagated from the sensor opening 192 (light-receiving unit) to the sensor unit 181 via the optical propagation path 105, but other optical systems are optional. For example, many patterns may be estimated regarding relationship between the optical propagation paths 105 and the light-receiving surface of the sensor unit 181.

In the case of an example in FIG. 18A, the optical propagation paths 105 and the upper surface (photoelectric conversion area) of the sensor unit 181 are brought into contact or approximated so as to irradiate light emitted from the optical propagation paths 105 on a particular area on the upper surface of the sensor unit 181 without leakage. Thus, leakage of light to an area where the light of another optical propagation path 105 is irradiated may be suppressed. That is to say, mixture of lights propagated through the optical propagation paths 105 may be suppressed. Accordingly, the sensor unit 181 may mutually independently subject the lights propagated through the optical propagation paths 105 to photoelectric conversion.

Also, the optical system including the optical propagation path 105 is not restricted to transmitting all wavelengths, and an optical propagation path having a different optical transparency property may be employed depending on the optical propagation paths 105. Thus, a color property may be obtained at the optical propagation paths without applying a color filter to the sensor unit 181, for example.

With the example in FIG. 18B, height is changed for each optical propagation path 105. An example has been described wherein weighting is performed from a signal value obtained for each optical propagation path 105, but weighting may also be implemented by restricting light to be input. The farther away from the photoelectric conversion area of the sensor unit 181 the optical propagation path 105 is, the more light is scattered, and the lower the output of the sensor unit 181 is. That is to say, weighting is performed on the optical propagation path 105 closer to the photoelectric conversion area of the sensor unit 181. In this manner, weighting may be applied depending on distance between the optical propagation paths 105 and the sensor unit 181.

Also, as illustrated in FIG. 18C, the emission element 261 may be used together. Further, as illustrated in FIG. 18D, condensing may be performed by providing lenses 271 to output portions of the optical propagation paths 105. Lights from the optical propagation paths 105 may be suppressed from being scattered by providing the lenses 271. That is to say, lights propagated through the optical propagation paths 105 may effectively be condensed in predetermined portions corresponding to the optical propagation paths 105 thereof in the photoelectric conversion area of the sensor unit 181.

Note that design between the light-receiving unit (portion where light is received first out of the system) such as the sensor opening 192, and the optical propagation paths 105 may also be optional.

Also, with the configuration of the photoelectric conversion area of the sensor unit 181, exit pupil correction may be performed. An example of exit pupil correction is disclosed in Japanese Unexamined Patent Application Publication No. 2010-232595 or the like. With the photoelectric conversion area of the sensor unit 181, an on-chip lens, a color filter, a photodiode, and so forth are formed. Exit pupil correction is correction wherein the positions of the on-chip lens and color filter (the positions of elements configured to perform photoelectric conversion such as a photodiode and so forth) are changed for each coordinate assuming the entry angle of light to be input to the photoelectric conversion area.

Figure 19C:
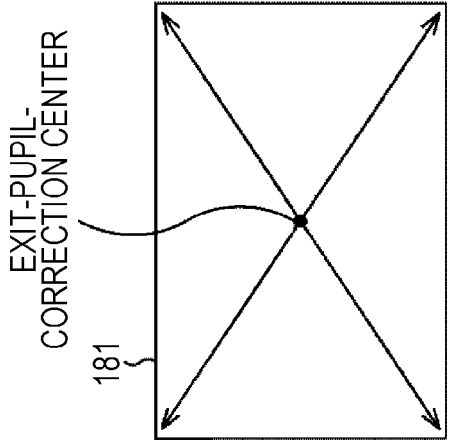
FIGS. 19A to 19C are diagrams for describing an example of exit pupil correction.
Figure 19B:
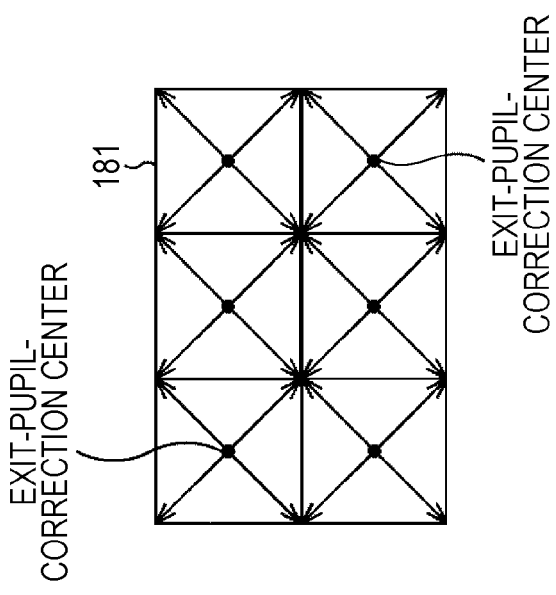
Figure 19A:
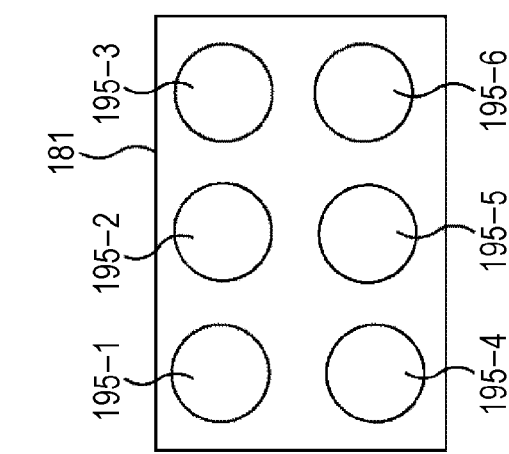

In the case of a common pupil correction, as illustrated in FIG. 19C, position correction of the on-chip lens, color filter, and so forth is performed so that pupil correction amount is gradually changed from the center of the sensor unit 181 toward the outer side. However, in the case of the present technology, as illustrated in FIG. 19A, lights (mutually independent lights) propagated through the mutually different optical propagation paths 105 are irradiated on multiple portions (areas 195-1 to 195-6) of the photoelectric conversion area of the same sensor unit 181. Accordingly, in accordance with this, as illustrated in FIG. 19B, exit pupil correction may be optimized for each optical propagation path 105. That is to say, as illustrated in FIG. 19A, position correction of the on-chip lens, color filter, and so forth may be performed so that pupil correction amount is changed from the center of each of the areas 195-1 to 195-6 toward the outer side. Thus, sensor properties with reduced loss of light and high S/N may be obtained.

3. Third Embodiment

Versatility

Description has been made so far regarding illuminance detection and color temperature detection, but detection is not restricted to these, and the present technology may be applied to detection of any information as long as the information relates to quality of light such as infrared detection or the like. Also, the array of a sensor is not restricted to the Bayer array of R, G, and B, another array such as the clear bit array or the like may be employed, or light may directly be received at a photodiode without providing a color filter.

The optical propagation paths 105 may transmit not only all wavelengths but also a particular wavelength area. Also, with both edges of the optical propagation paths 105, many optical systems including a lens and a filter (infrared cut filter or the like) may optionally be designed, and accordingly, distance between the optical propagation path 105 and the sensor unit 101B or sensor unit 181 may also optionally be set. Note that the emission elements 261 described with reference to FIG. 17 may be LEDs or organic ELs, and optional emission elements may be applied thereto.

Figure 20A:
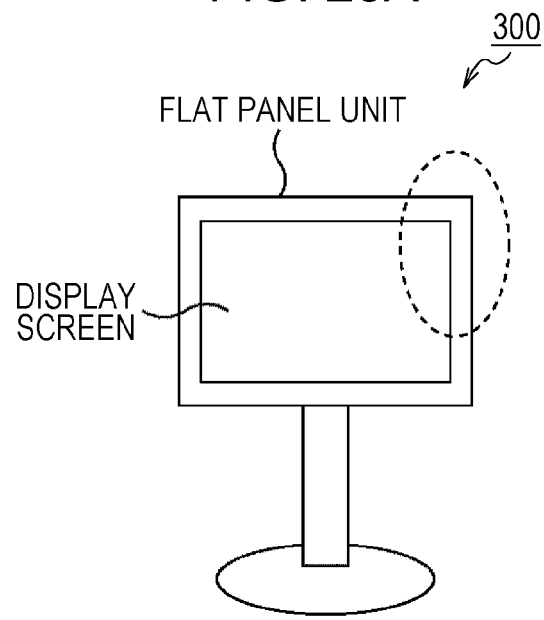
FIGS. 20A and 20B are diagrams for describing an example in the event of applying the present technology to a television receiver.
Figure 20B:
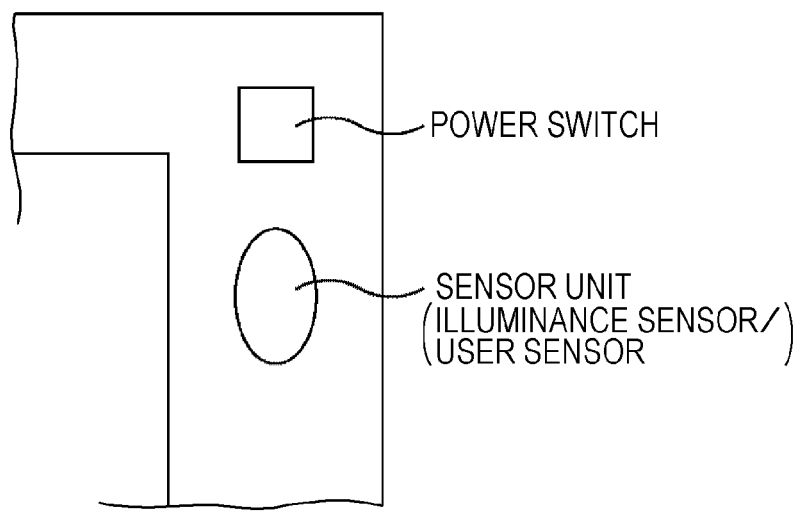

Also, the information processing apparatus described as the electronic device 160 or electronic device 190 may be an optional apparatus, for example, may be a cellular phone, may be a television receiver 300 as illustrated in FIGS. 20A and 20B, or may be any device as long as the device may perform sensing of optical features using the photoelectric conversion apparatus 100 or photoelectric conversion apparatus 180, such as a game machine, a computer, a lighting apparatus, an air conditioner, or the like. Also, optional control may be performed using the detection results of optical features thereof.

For example, with the television receiver 300 as illustrated in FIG. 20A, a sensor unit (a light-receiving unit corresponding to one or more optical propagation paths 105 of the photoelectric conversion apparatus 100 or photoelectric conversion apparatus 180 to which the present technology has been applied) may be provided below a power switch beside the display screen of a flat panel unit (FIG. 20B). The television receiver 300 may control luminance of the display screen according to detected illuminance using this sensor unit as an illuminance sensor. Also, an arrangement may be made wherein the television receiver 300 uses this sensor unit as a user sensor to detect change in optical features according to the user in front of the television receiver 300 moving, determines whether or not there is a user based on the detection results thereof, and in the event that there is no user for example, performs control according to the determination result thereof such as turning off the display screen.

For example, an imaging unit may be provided, and also, such a sensor unit may be readily provided in an optional position by applying the photoelectric conversion apparatus 100 to the television receiver 300. Also, such a sensor unit may be readily provided in multiple optional positions by applying the photoelectric conversion apparatus 180 to the television receiver 300.

Figure 21:
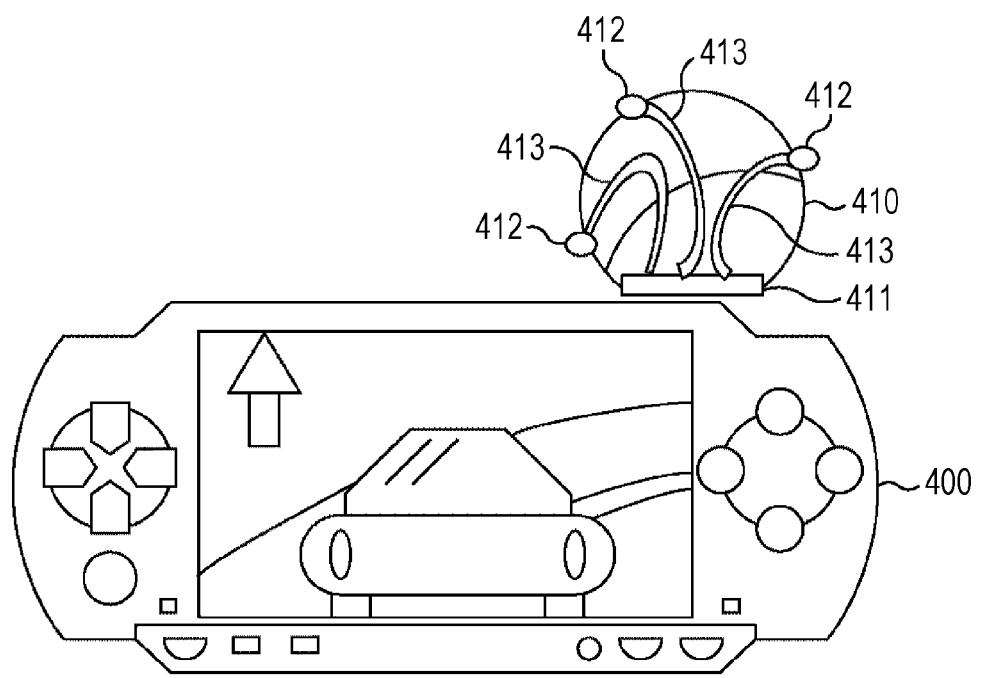
FIG. 21 is a diagram for describing an example of a case where the present technology is applied to a game machine.

Also, in the case of a game machine or computer, the photoelectric conversion apparatus 100 or photoelectric conversion apparatus 180 may be used for adjustment of display luminance, or used as a user interface. In the case of a lighting apparatus, the photoelectric conversion apparatus 100 or photoelectric conversion apparatus 180 may be used for brightness control of illumination according to brightness of a room, for example. Also, in the case of an air conditioner, the photoelectric conversion apparatus 100 or photoelectric conversion apparatus 180 may be used for control switching and so forth such that determination is made regarding whether or not there is a person to turn on/off a function. In any case, precision of sensing may be improved, and further many functions may be provided by applying the multi-point sensor according to the present technology such as the photoelectric conversion apparatus 180. Also, for example, such as with a sensor module 410 illustrated in FIG. 21, a sensor unit alone may be individually established as a peripheral device of a game machine 400, for example.

The sensor module 410 has a spherical casing, and multiple light-receiving units 412 are provided on the casing surface thereof so as to face in mutually different directions. Lights received at the light-receiving units 412 propagate the corresponding optical propagation path 413, and are subjected to photoelectric conversion at a sensor 411 provided therein (e.g., bottom), and illuminance or color temperature or the like is measured. This measurement result is supplied to the game machine 400 and used there.

For example, upon the user performing operation such as gripping or tracing the casing of this sensor module 410, illuminance, color temperature, or the like of light to be received at the light-receiving units 412 is changed. The sensor 411 detects such change, and supplies information regarding the change thereof to the game machine 400. The game machine 400 accepts the information regarding the change thereof as a user instruction. That is to say, in this case, the sensor module 410 is used as a user interface. In the case of the sensor module 410, the light-receiving units are disposed on the spherical casing surface, and accordingly, distance between the light-receiving units 412 is short, but the directions thereof may be set so as to mutually differ, and information with mutually high independency may mutually be obtained at each.

That is to say, for example, the sensor module 410 has the same function as with the interface of the electronic device 190 illustrated in FIG. 8B, but a smaller interface than the case of the electronic device 190 thereof may be realized. With the present technology, the optical propagation paths 105 are used, and accordingly, the light-receiving units may be readily provided onto a curved surface even with any shape.

Note that, with a cellular phone or the like, an arrangement may be made wherein an imaging lens for photo shooting is provided on the rear surface in the case that a surface where the display of the casing is provided is taken as the front surface, and an element capable of photoelectric conversion is also provided on the rear surface thereof, illuminance sensor openings (light-receiving units) are provided on the front surface, and light is propagated to the sensor on the rear surface side by an optical propagation path. That is to say, providing the light-receiving units in different directions may be readily realized.

As described above, layout design flexibility of a sensor to be used for usage other than imaging such as illuminance, color temperature, infrared, or the like may dramatically be improved by using the present technology. For example, as illustrated in FIG. 2, the imaging unit 101A and sensor unit 101B may be provided within the same substrate in a state in which the pixel area is divided. This is because an optical fiber is suitable for thinning as compared to a lens. Modules may be reduced in size by being provided within the same substrate, which may contribute to reduction of electronic devices such as cellular phones.

Illuminance of lights propagated from multiple places as illustrated in FIGS. 7A and 7B may be detected using the present technology, and with an electronic device as illustrated in FIGS. 8A to 8C, luminance in multiple places within the electronic device may be obtained. Specifically, even if strong light locally enters one light-receiving unit such as external light, influence of this local light may be excluded or reduced by referencing other sensor output. That is to say, illuminance or color temperature may be obtained without being disturbed by local light, and may be set to the optimal display luminance or color.

Further, as illustrated in FIGS. 8A to 8C, illuminance for each place is obtained, and accordingly, illuminance may be calculated after weighting is performed on a particular place, and display luminance may be set to the optimal luminance according to each place. The display luminance is set to the optimal luminance, and accordingly, excessively bright setting may be avoided and consumption power of the display may be reduced. Also, the display luminance is set to the optimal luminance, and accordingly, luminance setting with excellent visual recognition may also be set.

Also, the present technology may be used as a user interface, and particular operation may be executed by obtaining temporal change of brightness. Thus, operability of the electronic device may be improved.

Also, the present technology is employed, and accordingly, distinction may be made regarding whether or not the electronic device is put into a pocket or whether or not the electronic device is put into a bag, which is not achieved by a common illuminance sensor. Also, distinction may also be made regarding which room the user exists, or the like, and operability and convenience of the electronic device may be improved.

Further, as illustrated in FIG. 17, the optical propagation path may also be used for emission. In the case of FIG. 17, for example, even when the number of the emission elements 261 is four, scattered lights enter the optical propagation paths 105-1 to 105-6, and accordingly, for example, six locations (sensor openings 192-1 to 192-6) of the electronic device in FIGS. 8A to 8C may be brightened. That is to say, many emission units (sensor openings 192) may be provided with a few emission elements.

Also, a part of the sensor openings is brightened, and reflection thereof is receive at another sensor opening, and accordingly, this may be used for an interface or the like even at a dark place.

The present technology is not restricted to illuminance and color temperature detection, and may be applicable for many applications such as infrared detection and so forth.

It goes without saying that the above-mentioned apparatuses may have a configuration other than the above-mentioned configurations. Also, the mentioned-above apparatuses may be configured as a system made up of multiple apparatuses instead of a single apparatus.

The above-mentioned series of processing may be executed not only by hardware but also by software. In the event of executing the series of processing using software, a program making up the software thereof is installed to a computer. Here, the computer includes a computer built into dedicated hardware, or for example, a general-purpose personal computer or the like whereby various functions may be executed by installing various programs.

A recording medium thereof is, separately from the apparatus itself, made up of a removable medium (e.g., the removable medium 221 in FIG. 10) in which a program to be distributed for distributing the program to a user is recorded, for example. A magnetic disk (including a flexible disk) and an optical disc (including CD-ROM and DVD) are included in this removable medium. Further, a magneto-optical disk (including MD (Mini Disc)), semiconductor memory, and so forth are included in this removable medium. Also, the above-mentioned recording medium is not restricted to being configured of such a removable medium, but also may be a hard disk or the like included in the ROM of a control unit (e.g., the control unit 201 in FIG. 10) or storage unit (e.g., storage unit 214 in FIG. 10) in which the program to be distributed to the user is recorded, in a state built into the apparatus itself.

Note that the program that the computer executes may be a program where processing is performed in time sequence along a sequence described in the present Specification, or a program where processing is performed in parallel, or at requisite timing such as when call-up is performed.

Also, with the present Specification, steps for describing the program to be recorded in the recording medium include not only processing to be performed in time sequence along the described sequence but also processing not necessarily to be executed in time sequence but to be executed in parallel or individually.

Also, with the present Specification, the term "system" means a group of multiple components (apparatus, modules (parts), etc.), and it does not matter whether or not all of the components are housed in the same casing. According, multiple apparatuses which are housed in a separated casing and connected via a network, and a single apparatus in which multiple modules are housed in one casing are both systems.

Also, the configuration described above as a single apparatus (or processing unit) may be divided and configured as multiple apparatuses (or processing units). Conversely, the configurations described above as multiple apparatuses (or processing units) may be collected together and configured as a single apparatus (or processing unit). Also, it goes without saying that a configuration other than the above-mentioned configurations may be added to the configuration of each apparatus (each processing unit). Further, in the event that the configurations and operations serving as the entire system are substantially the same, part of the configuration of a certain apparatus (or processing unit) may be included in the configuration of another apparatus (or another processing unit).

Though suitable embodiments of the present disclosure have been described in detail with reference to the appended drawings, the technical scope of the present disclosure is not restricted to these examples. It is apparent to one having ordinary knowledge in the technical field of the present disclosure may conceive various modifications and corrected examples within the category of technical ideas described in the Claims, and it goes without saying that these are also understood to be belong to the technical scope of the present disclosure.

For example, with the present technology, the configuration of cloud computing may be taken wherein one function is processed by multiple apparatuses via a network in a cooperated and shared manner.

Also, the steps described with the above-mentioned flowcharts may be executed not only by a single apparatus but also by multiple apparatuses in a shared manner.

Further, in the event that multiple processes are included in a single step, the multiple processes included in the single step thereof may be executed not only by a single apparatus but also by multiple apparatuses in a shared manner.

Note that the present technology may also take the following configurations.

(1) An information processing apparatus including: multiple optical propagation paths configured to propagate light; a photoelectric conversion element configured to perform photoelectric conversion on light propagated through each of the multiple optical propagation paths at mutually different partial areas in a photoelectric conversion area; and an estimating unit configured to estimate illuminance or color temperature to be obtained at the photoelectric conversion element, using an electric signal corresponding to light propagated through each of the optical propagation paths.

(2) The information processing apparatus according to (1), further including: a control unit configured to control execution of processing based on the illuminance or the color temperature estimated by the estimating unit.

(3) The information processing apparatus according to (2), further including: an operation accepting unit configured to accept a user operation based on the illuminance or the color temperature estimated by the estimating unit; wherein the control unit controls execution of the processing in accordance with the user operation accepted by the operation accepting unit.

(4) The information processing apparatus according to (2), further including: a detecting unit configured to detect a position based on the illuminance or the color temperature estimated by the estimating unit; wherein the control unit controls execution of the processing in accordance with the position detected by the detecting unit.

(5) The information processing apparatus according to (2), further including: a display unit configured to display information; wherein the control unit controls luminance of the display unit based on the illuminance or the color temperature estimated by the estimating unit.

(6) The information processing apparatus according to (2), wherein the control unit controls execution of the processing based on temporal change in the illuminance or the color temperature estimated by the estimating unit.

(7) The information processing apparatus according to (1), further including: an emission unit configured to emit light; wherein the optical propagation paths propagate light output from the emission unit in a direction opposite to light to be subjected to photoelectric conversion.

(8) An information processing method for an information processing apparatus, wherein the information processing apparatus performs photoelectric conversion on light propagated through multiple optical propagation paths configured to propagate light, at mutually different partial areas in a photoelectric conversion area, and estimates illuminance or color temperature using an obtained electric signal corresponding to light propagated through each of the optical propagation paths.

(9) An information processing apparatus including: an optical propagation path configured to propagate light; a photoelectric conversion element configured to perform photoelectric conversion on light propagated through the optical propagation path at a partial area in photoelectric conversion area, and to perform photoelectric conversion on light not propagated through the optical propagation path at another area in the photoelectric conversion area; and an estimating unit configured to estimate illuminance or color temperature to be obtained at the partial area in the photoelectric conversion area, using an electric signal corresponding to light propagated through the optical propagation path.

(10) The information processing apparatus according to (9), further including: a module configured to shield the whole of the photoelectric conversion area against peripheries excluding an optical path of light where photoelectric conversion is performed.

(11) The information processing apparatus according to (10), further including: a shielding plate configured to mutually shield the partial area and the other area.

(12) The information processing apparatus according to (9), wherein the photoelectric conversion element includes a first readout unit configured to read out an electric signal to be obtained in the partial area, and a second readout unit configured to read out an electric signal to be obtained in the other area, which operates independently from the first readout unit.

(13) The information processing apparatus according to (9), further including: an image data generator configured to generate image data using an electric signal corresponding to light not propagated through the optical propagation path, to be obtained in the other area.

(14) An information processing method for an information processing apparatus, wherein the information processing apparatus performs, in a partial area of a photoelectric conversion area of a photoelectric conversion element, photoelectric conversion on light propagated through an optical propagation path, estimates illuminance or color temperature using an obtained electric signal, and performs, in another area in the photoelectric conversion area, photoelectric conversion on light not propagated through the optical propagation path.

(15) A photoelectric conversion apparatus including: multiple optical propagation paths configured to propagate light; and a photoelectric conversion element configured to perform photoelectric conversion on lights propagated through the multiple optical propagation paths at mutually different partial areas in a photoelectric conversion area.

(16) The photoelectric conversion apparatus according to (15), wherein the optical propagation path is made up of a predetermined substance; and wherein the light propagates through the substance.

(17) The photoelectric conversion apparatus according to (16), wherein the optical propagation path is an optical fiber made of quartz glass.

(18) A photoelectric conversion apparatus including: an optical propagation path configured to propagate light; and a photoelectric conversion element configured to perform photoelectric conversion on light propagated through the optical propagation path at a partial area in a photoelectric conversion area, and to perform photoelectric conversion on light not propagated through the optical propagation path at another area in the photoelectric conversion area.

(19) The photoelectric conversion apparatus according to (18), wherein the optical propagation path is made up of a predetermined substance; and wherein the light propagates through the substance.

(20) The photoelectric conversion apparatus according to (19), wherein the optical propagation path is an optical fiber made of quartz glass.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    first optical propagation paths that propagate a first light;
    second optical propagation paths that propagate a second light;
    a first sensor configured to generate a first signal by receiving the first light through the first optical propagation paths;
    a second sensor configured to generate a second signal by receiving the second light through the second optical propagation paths;
    an estimating unit configured to estimate a physical quantity to be obtained from the first signal and the second signal;
    an operation accepting unit configured to accept a user operation based on an illuminance or a color temperature estimated by the estimating unit; and
    a control unit configured to control execution of processing in accordance with the user operation accepted by the operation accepting unit.

2. The information processing apparatus according to claim 1,
    wherein the control unit is configured to control the execution of processing based on the illuminance or the color temperature estimated by the estimating unit.

3. An information processing apparatus comprising:
    first optical propagation paths that propagate a first light;
    second optical propagation paths that propagate a second light;
    a first sensor configured to generate a first signal by receiving the first light through the first optical propagation paths;
    a second sensor configured to generate a second signal by receiving the second light through the second optical propagation paths;
    an estimating unit configured to estimate a physical quantity to be obtained from the first signal and the second signal;
    a control unit configured to control execution of processing based on an illuminance or a color temperature estimated by the estimating unit; and
    a detecting unit configured to detect a position based on the illuminance or the color temperature estimated by the estimating unit;
    wherein the control unit is configured to control the execution of the processing in accordance with the position detected by the detecting unit.

4. The information processing apparatus according to claim 1, further comprising:
    a display unit configured to display information;
    wherein the control unit is configured to control luminance of the display unit based on the illuminance or the color temperature estimated by the estimating unit.

5. The information processing apparatus according to claim 1, wherein the control unit is configured to control execution of the processing based on temporal change in the illuminance or the color temperature estimated by the estimating unit.

6. An information processing apparatus comprising:
    first optical propagation paths that propagate a first light;
    second optical propagation paths that propagate a second light;
    a first sensor configured to generate a first signal by receiving the first light through the first optical propagation paths;
    a second sensor configured to generate a second signal by receiving the second light through the second optical propagation paths;
    an estimating unit configured to estimate a physical quantity to be obtained from the first signal and the second signal; and
    an emission unit configured to emit light;
    wherein the first and second optical propagation paths propagate light output from the emission unit in a direction opposite to light to be subjected to photoelectric conversion.

* * * * *